(12) United States Patent
Skeen

(10) Patent No.: US 12,354,157 B2
(45) Date of Patent: Jul. 8, 2025

(54) METHOD, SYSTEM, AND MEDIA FOR EXTENDED REALITY STOREFRONTS

(71) Applicant: Block, Inc., Oakland, CA (US)

(72) Inventor: Joshua Skeen, Atlanta, GA (US)

(73) Assignee: Block, Inc., Oakland, CA (US)

(*) Notice: Subject to any disclaimer, the term of this patent is extended or adjusted under 35 U.S.C. 154(b) by 0 days.

(21) Appl. No.: 17/988,583

(22) Filed: Nov. 16, 2022

(65) Prior Publication Data

US 2024/0161178 A1    May 16, 2024

(51) Int. Cl.
| | |
|---|---|
| G06Q 30/0601 | (2023.01) |
| G06Q 30/0251 | (2023.01) |
| G06T 13/40 | (2011.01) |
| G06T 17/20 | (2006.01) |
| G06T 19/00 | (2011.01) |

(52) U.S. Cl.
CPC ..... *G06Q 30/0643* (2013.01); *G06Q 30/0271* (2013.01); *G06Q 30/0631* (2013.01); *G06Q 30/0633* (2013.01); *G06T 13/40* (2013.01); *G06T 17/20* (2013.01); *G06T 19/003* (2013.01); *G06T 19/006* (2013.01)

(58) Field of Classification Search
CPC ........... G06Q 30/0271; G06Q 30/0631; G06Q 30/0633; G06Q 30/0601–0645; G06T 19/006
USPC .............................................. 705/26.1–27.2
See application file for complete search history.

(56) References Cited

U.S. PATENT DOCUMENTS

| | | | |
|---|---|---|---|
| 10,049,500 B2 | 8/2018 | Morrison | |
| 10,977,720 B2 | 4/2021 | Ramos et al. | |
| 2011/0004481 A1* | 1/2011 | Jones | G06F 3/011 |
| | | | 705/1.1 |
| 2011/0134108 A1 | 6/2011 | Hertenstein | |
| 2012/0158548 A1* | 6/2012 | Conlon | G06Q 10/087 |
| | | | 705/27.1 |
| 2014/0100994 A1 | 4/2014 | Tatzel et al. | |
| 2014/0100996 A1 | 4/2014 | Klein et al. | |
| 2016/0253746 A1 | 9/2016 | Morrison | |
| 2020/0302510 A1* | 9/2020 | Chachek | G06Q 30/0639 |
| 2020/0302693 A1* | 9/2020 | Singh | G06Q 30/0643 |
| 2021/0166459 A1* | 6/2021 | Miller, IV | G06F 3/011 |

(Continued)

OTHER PUBLICATIONS

Simon Read, How many consumers are shopping in virtual reality and what can it offer them?, World Economic Forum, Aug. 23, 2022 (Year: 2022).*

*Primary Examiner* — Marissa Thein
*Assistant Examiner* — Anna Mae Mitros
(74) *Attorney, Agent, or Firm* — Lee & Hayes, P.C.

(57) ABSTRACT

Implementing extended reality (XR) storefronts is described. A server(s) may access catalogue data associated with items offered for sale by a merchant via an existing online storefront or an existing brick-and-mortar store. The server(s) may generate digital representations of the items, and generate a XR storefront including the digital representations of the items positioned within a virtual space. The server(s) may store storefront data representing the XR storefront in a datastore(s). At runtime, the server(s) may receive, from an electronic device of a customer, a request to access the XR storefront. In response, the server(s) may access the storefront data and cause the electronic device to display the XR storefront based at least in part on the storefront data.

21 Claims, 16 Drawing Sheets

(56) References Cited

U.S. PATENT DOCUMENTS

2021/0224948 A1* 7/2021 Steiner .................... G06T 3/40
2022/0374968 A1* 11/2022 Berger .................. G06Q 50/01
2022/0383396 A1* 12/2022 Haapoja ............. G06Q 30/0639

* cited by examiner

METHOD, SYSTEM, AND MEDIA FOR EXTENDED REALITY STOREFRONTS

TECHNICAL FIELD

Merchants can offer their items for sale on electronic commerce (ecommerce) platforms and/or in brick-and-mortar stores. Customers who shop for items online can browse images of items, read descriptions of the items, and read customer reviews of the items. Customers who shop for items in brick-and-mortar stores have to travel to the store, and once inside the store, the customers can typically examine items that are on display in the store.

BRIEF DESCRIPTION OF THE DRAWINGS

Features of the present disclosure, its nature and various advantages, will be more apparent upon consideration of the following detailed description, taken in conjunction with the accompanying drawings.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
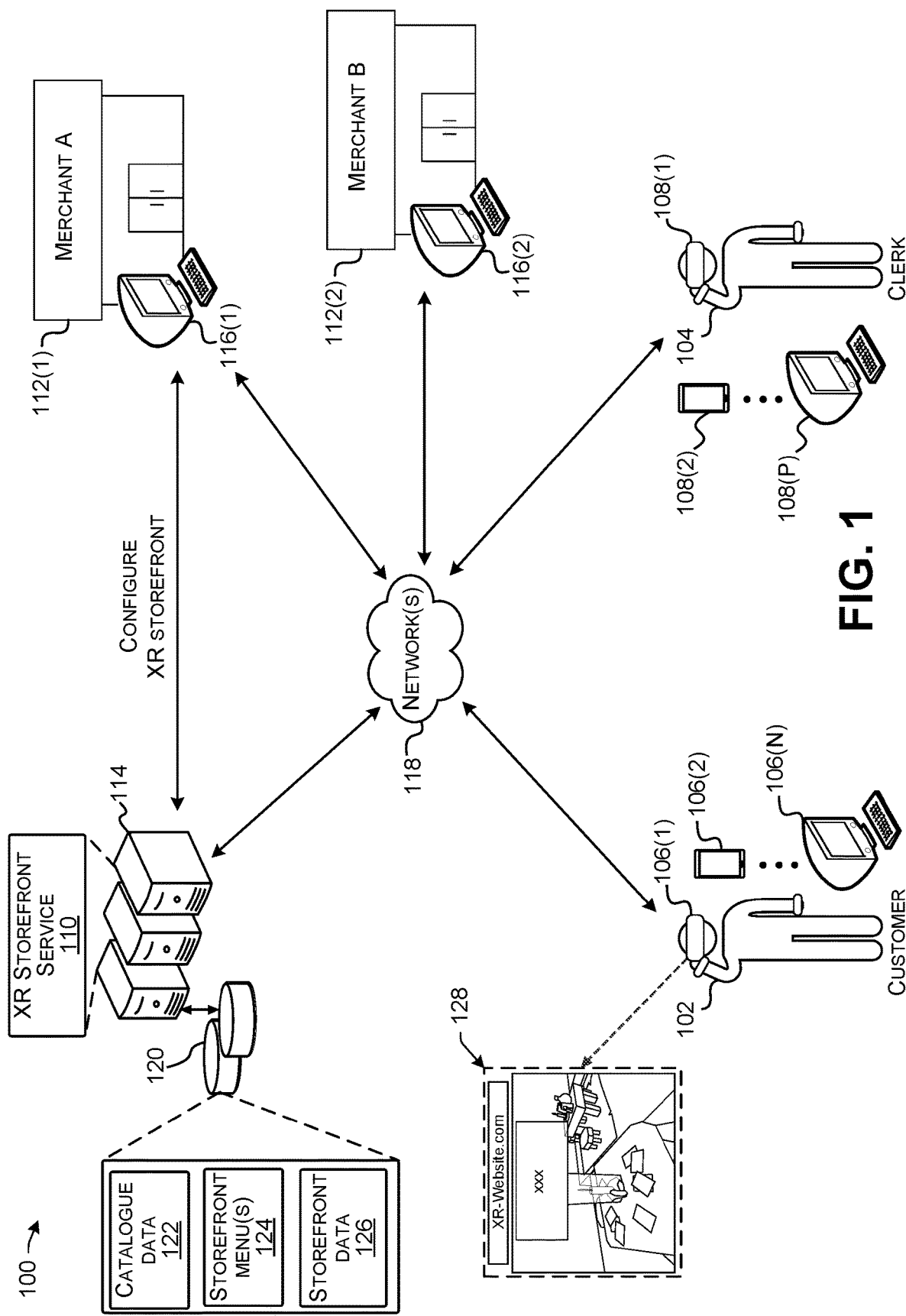
FIG. 1 is an example environment for implementing extended reality (XR) storefronts, according to an implementation of the present subject matter.

Described herein are, among other things, techniques, devices, and systems for implementing XR storefronts. An XR storefront may be a storefront that uses XR technology. XR technology may include 360-degree video, virtual reality (VR) technology, Augmented Reality (AR) technology, or Mixed Reality (MR) technology, or combination thereof. Depending on the choice of the XR technology, a user experiences varying levels of "immersion." Accordingly, a XR storefront service can be implemented as a VR storefront service, an AR storefront service, a MR storefront service, or the like. In an example, a VR storefront service may facilitate configuring VR storefronts and subsequently causing the VR storefronts to be displayed on end user devices. In another example, an AR storefront service may facilitate configuring AR storefronts and subsequently causing the AR storefronts to be displayed on end user devices. A computing platform that implements the XR storefront service has access to catalogue data associated with a plurality of merchants. For an individual merchant, this catalogue data may be associated with items offered for sale by the merchant via an existing online storefront or an existing brick-and-mortar store. For example, the merchant may utilize the computing platform as an ecommerce platform to sell items online, and the catalogue data associated with the merchant may specify the merchant's items that are available for purchase via the ecommerce platform. Additionally, or alternatively, the catalogue data may be associated with the merchant's items that are available for purchase from a brick-and-mortar store. The XR storefront service may be used to generate digital representations of items included in the catalogue data of a merchant(s), and to generate a XR storefront including the digital representations of the items positioned within a virtual space. Once a XR storefront is configured, storefront data representing the XR storefront can be stored in a datastore(s) for accessing the storefront data at runtime. The XR storefront service can maintain multiple different XR storefronts associated with multiple different merchants to implement a virtual shopping experience for customers akin to a virtual shopping mall. Customers may request access to a XR storefront using their electronic devices. When a customer requests access to a XR storefront, the XR storefront service may be executed to access storefront data representing the XR storefront, and to cause the customer's electronic device to display the XR storefront based at least in part on the storefront data. An advantage of using catalogue data of an already existing online storefront or an existing brick-and-mortar store with a XR storefront is that memory may be saved from avoiding needing to store separate catalogue data for the XR storefront and that processing and transmission resources needed for updates may be reduced. For example, instead of first catalogue data for an online storefront and second catalogue data for an XR storefront that each require separate update instructions, shared catalogue data may use a single update instruction. Another advantage may be allowing users to access more information than a traditional two-dimensional graphical user interface is able to provide. Using the XR technology described here, the user may be able to view vast amounts of data in the context of a real scene in front of the user. Alternatively or additionally, XR tags (or virtual objects) can interact with and respond to virtual representations of the dynamic real objects. This may allow the dynamic real objects, such as storefronts, POS devices, etc., to be visually and physically incorporated in the virtual environment.

The techniques, devices, and systems described herein allow merchants to host immersive XR experiences for their customers, some of whom may not be collocated in the same physical location. Online storefronts may offer predominantly two-dimensional (2D) browsing experiences for customers, and, as a result, these online storefronts may not mimic an actual shopping experience that a customer may have within a brick-and-mortar store. Moreover, customers may be located in disparate geographical locations, making it difficult for friends to shop together at a brick-and-mortar store, and/or making it difficult for certain individuals who live in remote geographical locations to shop at physical retail locations, seeing as how retail locations tend to be aggregated in more densely-populated, urban and suburban areas. Furthermore, some customers, especially the elderly and immunocompromised, may be wary of visiting a brick-and-mortar store to shop in-person due to the risk of contracting communicable diseases from other shoppers. The techniques, devices, and systems disclosed herein improve customer engagement with merchant storefronts through the implementation of a XR storefront service that offers an immersive, virtual shopping experience for customers. This immersive virtual shopping experience provides a more intuitive browsing experience because it mimics a real-life shopping experience at a brick-and-mortar store. Customers can access XR storefronts remotely (e.g., from the comfort of their own homes) using electronic devices, which alleviates the issues surrounding in-person shopping, as noted above. In some examples, the disclosed XR storefront service provides multi-user support to enable interactions between users within the XR storefronts. For example, a merchant (or a clerk associated therewith) can interact with customers while the customers are accessing a XR storefront of the merchant, and/or friends can shop together in a XR storefront even though they are located in disparate geographical locations.

In some examples, the techniques, devices, and systems described herein allow for setting up and configuring XR storefronts with relative ease. Existing tools for providing a XR experience to end users are often catered to software specialists, such as 3D modelers, game designers, and the like. Most people are not trained to use these existing tools, and, as such, a specialist(s) is often hired to help implement a XR experience. The techniques, devices, and systems described herein provide a democratized on-ramp mechanism for users, such as merchants, to configure XR storefronts with relative ease. For example, the XR storefront service may provide merchants with an easy-to-use storefront configuration tool (e.g., an Internet-accessible user interface(s)). In some examples, this storefront configuration tool is provided as an extension to an existing ecommerce platform to allow merchants to easily configure their XR storefronts by choosing from available storefront options and activating their configured XR storefronts through the click of a button.

In some examples, the techniques, devices, and systems described herein further improve customer engagement with merchant storefronts by building upon a web-based content delivery platform. Today, users are often forced to purchase specialty hardware (e.g., a XR headset) to engage in a XR experience. While the techniques, devices, and systems described herein allow for accessing XR storefronts using such specialty hardware, customers can also access the disclosed XR storefronts using a traditional web browser on any suitable type of electronic device, including a mobile phone, a tablet computer, a desktop personal computer (PC), or the like. To illustrate, a customer can enter a uniform resource locator (URL) into a browser on a mobile phone to access the disclosed XR storefronts, and, in response, the XR storefront service causes the browser to display a XR storefront, such as a VR storefront. This web-based content delivery platform provides XR storefront access to a wider variety of customers. Similarly, users can access AR storefronts using the suitable type of electronic device. For instance, a customer can access an AR storefront using a tablet computer by viewing the AR storefront "through the lens" of a camera on the tablet computer. Further, the customer could navigate the AR storefront using touch gestures or by utilizing the gyroscope, accelerometer and/or LiDAR of the tablet computer. An existing brick-and-mortar store can also be augmented with specialty AR hardware to enhance the shopping experience for customers visiting the store in-person. For example, specialty AR hardware could include cameras and displays fitted in the store to enable customers to engage in an AR experience similar to if the customer was using specialty hardware.

In some examples, the techniques, devices, and systems described herein provide improved user interfaces for electronic devices through the implementation of personalized and/or customized XR storefronts. Traditional shopping experiences, both online and in-person, are limited because customers are constrained to shopping for items from a single merchant at any given time. For example, a customer in a physical shopping mall has to visit stores of different merchants sequentially, oftentimes traveling far distances between different stores. In an online setting, as another example, an ecommerce web page typically displays items from a single merchant, which forces a customer to switch between browsers and/or applications in order to browse items offered for sale from multiple different merchants. Additionally, given the large number of merchants that sell items on ecommerce platforms today, it can be difficult to efficiently browse items from the customer's favorite merchants. The techniques, devices, and systems described herein can be used to provide a customer with access to a XR storefront that is personalized and/or customized to the specific customer based on customer data available to the XR storefront service and/or based on the customer's own curation. In this manner, items from multiple merchants that the customer is most interested in browsing may be showcased in a single XR storefront for added shopping convenience from the comfort of the customer's own home, and without having to switch between browsers and/or applications on the customer's device. Accordingly, the single XR storefront may avoid having users use multiple browsers at once and enable a single cart/checkout process, which may provide reduction of memory and processing of devices. Furthermore, providing a customer with items from multiple merchants in a single XR storefront assists the customer in preforming a technical task of searching and retrieving items more efficiently in XR. As XR mimics the way in which users interact with the real world, the way in which users shop in real life may be imitated using a XR storefront. By placing items in a XR storefront from different merchants and/or browsers, a user is able to browse/experience a wider range of items (which, in some cases, would normally not be showcased together). As such, the single XR storefront enables a user to search and retrieve items from multiple merchants/browsers faster than if switching between different merchants (browsers) was required.

The preceding summary is provided for the purposes of summarizing some example embodiments to provide a basic understanding of aspects of the subject matter described herein. Accordingly, the above-described features are merely examples and should not be construed as limiting in any way. Other features, aspects, and advantages of the subject matter described herein will become apparent from the following description of the Figures and Claims.

FIG. 1 is an example environment 100 for implementing XR storefronts, according to an implementation of the present subject matter. As depicted, the example environment 100 may include users, such as a customer 102 and a clerk 104. The customer 102 may be associated with one or more electronic devices 106(1) to 106(N) (collectively 106), and the clerk 104 may be associated with one or more electronic devices 108(1) to 108(P) (collectively 108), where N and P can each be any suitable integer. The electronic devices 106, 108 may be configured to execute browsers and/or applications thereon. In some examples, respective browsers, when executing on the electronic devices 106, 108, may allow the users 102, 104 to interact with or access services, such as a XR storefront service 110. In some examples, the users 102, 104 can interact with user interfaces displayed (e.g., via browsers, applications, etc.) on the displays of their respective devices 106, 108 to engage in an immersive, XR shopping experience by accessing one or more XR storefronts implemented by the XR storefront service 110. In some examples, the XR storefronts allows customers, such as the customer 102, to transfer funds to merchants 112. For example, the customer 102 may transact with a merchant 112 to purchase an item(s) from the merchant 112. In at least one example, the XR storefronts implemented by the XR storefront service 110 allow for the efficient transfer of funds (e.g., fiat currency, cryptocurrencies, etc.) between customers and merchants 112 associated with XR storefront service 110. Such transfers can be "efficient" in that they can happen electronically, in real-time or near real-time, due to a complex integration of software and hardware components configured to facilitate such transfers.

FIG. 1 depicts the XR storefront service 110 as being implemented on or by one or more servers 114. FIG. 1 also depicts merchant devices 116 (e.g., electronic devices), which may be used by the merchants 112 to access the XR storefront service 110. As depicted by FIG. 1, the user electronic devices 106 and 108, the server(s) 114, and the merchant devices(s) 116 may be communicatively coupled via one or more network(s) 118, such as a wide area network (WAN) (e.g., the Internet, a cellular network, etc.). In some examples, the server(s) 114 may include a cloud-based computing architecture suitable for hosting and servicing XR storefront sessions implemented by the XR storefront service 110 on behalf of users, such as the users 102, 104. In particular examples, the server(s) 114 may include a Platform as a Service (PaaS) architecture, a Software as a Service (SaaS) architecture, an Infrastructure as a Service (IaaS), a Data as a Service (DaaS), a Compute as a Service (CaaS), or other similar cloud-based computing architecture (e.g., "X" as a Service (XaaS)).

The servers 114 may be configured to provide processing or computing support for the XR storefront service 110. The servers 114 may have access to one or more data stores 120. The data store(s) 120 may include, for example, one or more internal data stores that may be utilized to store data associated with users 102, 104, and/or merchants 112, and/or XR storefronts. As shown in FIG. 1, the data store(s) 120 may be used to maintain catalogue data 122, storefront menu(s) 124, and/or storefront data 126, among other data described herein. For an individual merchant, such as the merchant 112(1) ("Merchant A"), the catalogue data 122 may be associated with items offered for sale by the merchant 112(1) via an existing online storefront and/or an existing brick-and-mortar store. For example, the merchant 112(1) may utilize the server(s) 114 as an ecommerce platform to sell items online, and the catalogue data 122 associated with the merchant 112(1) may specify the merchant's 112(1) items that are available for purchase via the ecommerce platform. Additionally, or alternatively, the catalogue data 122 may be associated with the merchant's 112(1) items that are available for purchase from a brick-and-mortar store. In some examples, the catalogue data 122 may include image data representing images of items and/or 3D model data associated with items to enable user interaction with a 360-degree interactive model of an item (e.g., a product), thereby allowing a customer to view an item (e.g., a product) in 3D.

Individual merchants 112 may use a merchant device 116 to access the XR storefront service 110 in order to configure a XR storefront. FIG. 1 shows the merchant 112(1) using a merchant device 116(1) to access the XR storefront service 110 (e.g., the server(s) 114) over the network(s) 118 for purposes of configuring a XR storefront. In an example, a merchant 112 may be interested in setting up and configuring a VR storefront in order provide an immersive VR experience for customers, such as the customer 102, and, in some examples, an interactive experience where the customers can interact with each other and with one or more clerks 104 associated with the merchant 112. Configuring a XR storefront can involve various operations, as described herein. In some examples, a merchant 112(1) may access a storefront menu(s) 124 that includes multiple different XR storefronts. That is, a storefront menu 124 may be displayed on the merchant device 116(1), thereby allowing the merchant 112(1) to select a XR storefront from the menu 124. These predefined XR storefronts in the menu 124 may have been created and tested for compatibility with a XR shopping experience by a development team associated with the XR storefront service 110. In some examples, the merchant 112(1) may use the XR storefront service 110 to generate digital representations of items included in its catalogue data 122, and to generate a XR storefront (e.g., the XR storefront selected from the menu 124) including the digital representations of the items positioned within a virtual space corresponding to the XR storefront. Once a XR storefront is configured, storefront data 126 representing the XR storefront can be stored in the datastore(s) 120 for accessing the storefront data 126 at runtime. The XR storefront service 110 can maintain multiple different XR storefronts associated with multiple different merchants 112 to implement a virtual shopping experience for customers (e.g., the customer 102) akin to a virtual shopping mall. Customers may request access to a XR storefront using their electronic devices. For example, when the customer 102 requests access to a XR storefront, the XR storefront service 110 may be executed to access storefront data 126 representing the XR storefront, and to cause the customer's 102 electronic device 106 to display the XR storefront based at least in part on the storefront data 126.

The XR storefront service 110 may cause various user interfaces to be presented on a user's electronic device 106, 108, as will be described in more detail with respect to the following figures. In the example of FIG. 1, a XR storefront is displayed on the electronic device 106(1) of the customer 102 via a user interface 128 in response to the customer 102 requesting access to the XR storefront. In some examples, the user interface 128 represents a user interface of a browser executing on the electronic device 106(1). For instance, the customer 102 may have entered a URL (e.g., "XR-Website.com") into a browser executing on the electronic device 106(1) to connect to the server(s) 114 over the network(s) 118. In some examples, the customer 102 may navigate to a user interface to access a XR storefront, causing the server(s) 114 to receive the request from the electronic device 106(1), and the XR storefront service 110 may access the relevant storefront data 126, download at least some of the storefront data 126 to the electronic device 106(1), and the browser may display the XR storefront on the electronic device 106(1) based at least in part on the downloaded storefront data 126. Although the user interface 128 in FIG. 1 depicts a VR storefront, and although the electronic device 106(1) displaying the user interface 128 in FIG. 1 is shown as a head-mounted display (e.g., a VR headset), which may provide an optimized VR experience for the customer 102, the web-based content delivery platform utilized by the XR storefront service 110 may allow the customer 102 to access any suitable type of XR storefront (e.g., a VR storefront, AR storefront, MR storefront, etc.) using any suitable client device or technology, such as a browser on a mobile phone 106(2), a desktop PC 106(N), or any other suitable type of electronic device 106. Accordingly, if the customer 102 does not own a head-mounted display 106(1), the customer 102 can still access various XR storefronts using the disclosed XR storefront service 110.

The XR storefront service 110 can utilize any suitable type of component(s) to implement XR storefronts, as described herein. In some examples, the WebXR Device application programming interface (API) is utilized by the XR storefront service 110 to provide the interactive and immersive experiences to end users (e.g., customers 102, clerks 104, etc.) described herein, such as by rendering XR content (e.g., 3D scenes) to the user's electronic devices 106, 108, while maintaining compatibility with traditional browsers. In some examples, the A-frame open source library is utilized by the XR storefront service 110. The A-frame open source library uses HyperText Markup Language (HTML) and JavaScript as the central primitive for defining/building XR experiences. The code used by the XR storefront service 110 to implement the XR storefronts can be declarative HTML and/or JavaScript. This declarative software stack allows developers who are unfamiliar with more sophisticated game engines to develop a XR experience for merchants 112 using HTML and/or JavaScript code, and it also allows the end user (e.g., the customer 102, the clerk 104, etc.) to access XR storefronts (e.g., by downloading storefront data 126 used to render content (e.g., 3D scenes) via a browser without having to download special-purpose applications or programs to access the XR storefronts.

Figure 2:
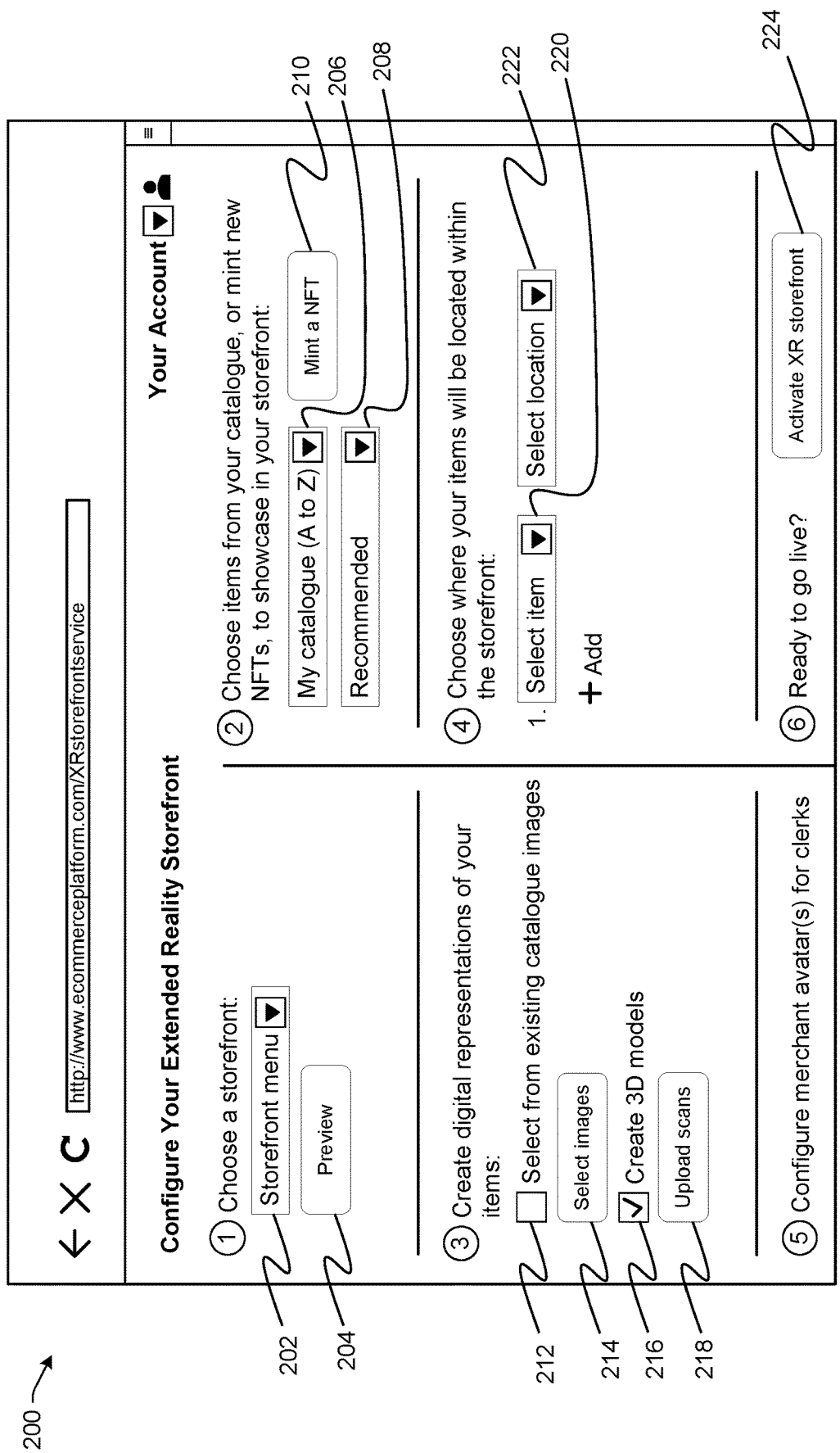
FIG. 2 is an example user interface for configuring a XR storefront, according to an implementation of the present subject matter.

FIG. 2 is an example user interface 200 for configuring a XR storefront, according to an implementation of the present subject matter. In general, various user interfaces may be displayed on a device 106, 108, 116 that is accessing the XR storefront service 110 over the network(s) 118. FIG. 2 shows an example user interface 200 that can be displayed on a merchant device 116 at a time when a merchant 112 is configuring a XR storefront. Although the user interface 200 is shown as a browser, it is to be appreciated that an application may be downloaded from the XR storefront service 110 to a merchant device 116, and that the downloaded application may present a similar user interface. The user interface 200 may provide merchants 112 with a democratized on-ramp to configure their own XR storefronts, meaning that the merchant does not have to be a specialist (e.g., a 3D modeler, a game designer, etc.) to use the user interface 200 for configuring a XR storefront. In some examples, the user interface 200 can be used to configure a merchant-specific XR storefront for a particular merchant 112. For example, the merchant 112(1) introduced in FIG. 1 may use a merchant device 116(1) to access a website associated with the server(s) 114. As mentioned, the server(s) 114 may represent an ecommerce platform (or a web hosting service) where a plurality of merchants have existing online storefronts that are not XR storefronts, but rather conventional ecommerce sites where items are offered for sale online. In this example, the website may offer (e.g., promote) the XR storefront service 110 as an opt-in feature to the merchant 112(1). If the merchant 112(1) opts into the XR storefront service 110 (e.g., by selecting an interactive element to opt-in), the browser executing on the merchant device 116(1) may navigate to the user interface 200 shown in FIG. 2, which may represent a web page of the website associated with the server(s) 114.

The user interface 200 includes one or more interactive elements with which the merchant 112(1) can interact (e.g., select via user input). In the example of FIG. 2, the user interface 200 provides a series of steps for the merchant 112 to complete in order to configure a XR storefront. As illustrated by the encircled number 1 in FIG. 2, a first step may be to select a XR storefront from a menu 124 of multiple different XR storefronts. For example, the merchant 112(1) can interact with (e.g., select) a drop-down menu 202 to reveal a list of different XR storefronts that the merchant 112(1) can choose from. As mentioned, these predefined XR storefronts in the menu 124 may have been created and tested for compatibility with a XR shopping experience by a development team associated with the XR storefront service 110. Although the merchant 112(1) may be constrained to using one of the predefined XR storefronts in the menu 124, by selecting a XR storefront of their choice, the merchant 112(1) is able to customize the XR storefront. Each XR storefront in the menu 124 may be associated with a corresponding 3D model that is maintained in the datastore(s) 120. After selecting a XR storefront from the menu 124, the merchant 112(1) may be able to preview the selected XR storefront by selecting a "preview" button 204. For example, upon selecting the preview button 204, a window showing the selected XR storefront may be displayed on the merchant device 116(1), such as a pop-up window. In some example, the preview may be a static image of the XR storefront, while in other examples, the merchant 112(1) may be able to interact with the 3D model corresponding to the XR storefront and/or view video demonstrations of what an end user would see during a XR experience within the XR storefront.

In some examples, the XR storefront service 110 may provide a XR storefront creation tool to create a new XR storefront. For example, the merchant 112(1) may be able to modify an existing XR storefront in the menu, such as by changing colors, virtual objects, lighting, spaces, etc., and/or the merchant 112(1) may be able to combine (e.g., mix-and-match) multiple different XR storefronts to create a unique XR storefront. In some examples, the XR storefront service 110 may offer (e.g., as a premium service) the ability for the merchant 112(1) to create a XR storefront that is a replica of a brick-and-mortar store of the merchant 112(1). For example, a service provider of the XR storefront service 110 may provide 3D scanning hardware to the merchant 112(1), which the merchant 112(1) can use to scan the interior space of an existing brick-and-mortar store, and the resulting scan data can be uploaded to the server(s) 114 and used to create a 3D model for a replica XR storefront. In other examples, the XR storefront service 110 may not provide 3D scanning hardware to the merchant 112(1) and the servers(s) 114 may instead receive scan data from 3D scanning hardware already possessed by the merchant 112(1). In some examples, the service provider may send personnel to a brick-and-mortar location to scan the interior space of an existing brick-and-mortar store as a service for the merchant 112(1). In some examples, this type of service may be provided in combination with a service to scan physical items of the merchant's 112(1) inventory to create 3D models of the items. After a merchant 112(1) creates a new, customized storefront, the merchant 112(1), as the author/creator of the XR storefront, may be given the option of making their XR storefront available to other merchants, such as via the menu 124. In these examples, a merchant 112 who creates a new XR storefront may receive a royalty on the back end in exchange for other merchants using their XR storefront. This may foster an ecosystem of XR storefront creation to drive more options for XR storefronts in the menu 124. In some examples, constraints may be applied for the creation of new XR storefronts to order to ensure a smooth XR experience for end users.

As illustrated by the encircled number 2 in FIG. 2, a second step may be to select items to showcase in the XR storefront. In some examples, the XR storefront service 110 may access the catalogue data 122 associated with the merchant 112(1) from the datastore(s) 120. For example, the merchant 112(1) can interact with (e.g., select) a drop-down menu 206 to reveal a list of items that the merchant 112(1) can choose from. The merchant 112(1) may have already setup a catalogue to sell these items online via an existing online storefront implemented by the server(s) 114. In some examples, the merchant 112(1) may have uploaded the list of items, which may, for example, correspond to items offered for sale at a brick-and-mortar store(s) of the merchant 112(1). Accordingly, the merchant 112(1) does not have to have an existing online presence in order to create a XR storefront. In some examples, if the merchant 112(1) uses a third-party ecommerce site to sell items, the merchant 112(1) may be able to import their catalogue of items using an import tool. However, for merchants 112 that have already setup a catalogue to sell items via the ecommerce platform represented by the server(s) 114, the XR storefront configuration user interface 200 can provide a plugin to the existing catalogue of the merchant 112, which allows for configuring the XR storefront from the existing catalogue data 122 of the merchant 112. An individual merchant 112 may have hundreds to thousands of items in their catalogue. Accordingly, the drop-down menu 206 may organize (e.g., sort, rank, etc.) the items in any suitable manner, such as from A to Z (or alphabetically), by category, by price, etc. This may make it easier for the merchant 112(1) to find items to showcase in the XR storefront. In some examples, the XR storefront service 110 may implement a recommendation engine to recommend a subset of items from the merchant's 112(1) catalogue to showcase in the XR storefront. For example, the merchant 112(1) can interact with (e.g., select) a drop-down menu 208 to reveal a list of recommended items that the merchant 112(1) can choose from. For example, the recommendation engine may recommend a subset of twenty items out of hundreds or thousands in the merchant's 112(1) catalogue. Such a recommendation may be based on any suitable item characteristic(s) that is indicative of the item being suitable for a XR experience, such as item category. In some examples, the recommendation engine may access sales data from other merchants 112 who have implemented XR storefronts to determine item categories and/or specific items that have sold well, and the recommended items may include those that have sold well in other merchants' XR storefronts. In some implementations, the recommendation may be based on how items are selling in-store or online for the merchant itself. For example, the XR storefront service 110 may prioritize recommending items that have sold more in-store or online for the merchant. In some implementations, recommendations may be based on determining that an item is sold in-store and online. For example, items that are sold both online and in-store may be those that are expected to sell more than items that are not sold online or not sold in-store by the merchant.

In some examples, the merchant 112(1) may walk around their existing brick-and-mortar store while capturing still images or video using a camera(s) (e.g., an RGB camera of a smart phone), and the merchant 112(1) may upload corresponding image data to the server(s) 114. The XR storefront service 110 may process the uploaded image data (e.g., using object recognition) to automatically identify, from the image data, items that are showcased in the brick-and-mortar store, and the items identified by the XR storefront service 110 can be made available for selection via the user interface 200 and/or recommended (e.g., via the drop-down menu 208 in the list of recommended items). In some examples, the user interface 200 may present an option to confirm, correct, and/or reject the items identified by the XR storefront service 110 based on the uploaded image data. In some examples, the items identified by the XR storefront service 110 from the uploaded image data may be cross-correlated with the items in the merchant's 112(1) catalogue (e.g., by accessing the catalogue data 122) to determine identifiers of the items identified in the image data. In some examples, the XR storefront service 110 may process the uploaded image data to determine locations within the brick-and-mortar store where the items are located, and these determined real-world locations may be used in various ways for configuring the XR storefront. For example, the determined real-world locations may be provided as input to the location selection functionality described below with reference to the encircled number 4 in FIG. 2. That is, the virtual locations may be determined based at least in part on the real-world locations. In some examples, the determined real-world locations of items may be analyzed to identify items that are located at or near the front of the brick-and-mortar store (e.g., near the entrance), or in another highly-visible area(s), and these items may be designated as featured items that are recommended for inclusion in the XR storefront.

In some examples, the user interface 200 may include an interactive element 210 to create new digital items that do not have a physical counterpart and that are not in the existing catalogue data 122 associated with the merchant 112(1). For example the interactive element 210 may be a "Mint a NFT" button that, upon selection, allows the merchant 112(1) to mint one or more nonfungible tokens (NFTs). A NFT is a one-of-a-kind digital asset that exists on a blockchain with unique identifiers and data. "Minting" (or "tokenizing") an NFT means adding the NFT to a blockchain and putting the NTF into circulation. Once minted, the NFT can be bought or sold, and the blockchain automatically tracks information relating to transactions involving the NFT. Accordingly, the merchant 112(1) can mint their own digital assets and offer them for sale as items in the XR storefront. In some examples, upon selecting the interactive element 210, the merchant 112(1) may be able to choose an item from their existing catalogue to mint as a NFT. For example, if the merchant (1) sells artwork, such as paintings, the merchant 112(1) may select a work of art and the XR storefront service 110 may submit a query to determine if the item is eligible to be minted as a NFT, and if the item is eligible, the item may be converted to a minted NFT and added to a set of selected items to showcase in the XR storefront. In other examples, the XR storefront service 110 may determine which items in the merchant's 112(1) catalogue are eligible to be minted as NFTs, and upon selecting the interactive element 210, the merchant 112(1) may be able to select the eligible items, but not the ineligible items. In some examples, the XR storefront service 110 may mint a NFT for the merchant 112(1). Alternatively, the XR storefront service 110 may provide the merchant 112(1) with instructions for minting a NFT.

As illustrated by the encircled number 3 in FIG. 2, a third step may be to create or generate digital representations of the selected items from the second step. The digital representations may be 2D representations or 3D representations. Accordingly, the user interface 200 may provide an option 212 to select from existing images in the merchant's 112(1) catalogue, along with a "select images" button 214, to select the desired images. In some examples, selection of the "select images" button 214 may allow for selecting existing 3D models of items that are being, or that have been, utilized on an ecommerce website of the merchant 112(1) to provide users with the ability to interact with a 360-degree interactive model of an item (e.g., a product). In other words, 3D model data associated with the selected items may be reused or repurposed for creating or generating the digital representations of the selected items for inclusion within the XR storefront. Additionally, or alternatively, the merchant 112(1) may be able to upload new images to use for 2D representations of the selected items. In any case, 2D images of items, such as those that are browsable by customers on an existing online storefront of the merchant 112(1), may be used to generate digital representations of the selected items. The user interface 200 may additionally, or alternatively, provide an option 216 to create 3D models of the selected items, along with an "upload scans" button 218 to upload scan data obtained from scanning the items in a real-world space. For example, a 3D scanning device may obtain scan data of an item from different angles, which is usable to create a 3D model of the item. A service provider of the XR storefront service 110 may provide this 3D scanning hardware and/or software to the merchant 112(1) and/or send personnel to the merchant's 112(1) brick-and-mortar store to obtain the scan data for the items the merchant 112(1) would like to showcase in the XR storefront. Creating 3D digital representations of items to showcase in the XR storefront is particularly useful for items that are more interesting to examine from different angles. The example of FIG. 2 shows that the merchant 112(1) has selected the option 216 to generate 3D digital representations of the selected items, and, as such, the merchant 112(1) may have uploaded scan data for the items to create the 3D representations.

In some implementations, the user interface 200 may provide an option for the merchant to provide input that identifies 3D representation of an item. For example, a manufacturer may provide a 3D model of an item at a URL and the user interface 200 may provide an option for the merchant to indicate and enter a URL for the 3D representation of the item.

As illustrated by the encircled number 4 in FIG. 2, a fourth step may be to indicate the respective positions within a virtual space corresponding to the XR storefront to position the digital representations of the items. For example, the merchant 112(1) can interact with (e.g., select) a drop-down menu 220 to reveal a list of the items that the merchant 112(1) selected at the second step, and the merchant 112(1) may select one of those items. In addition, the merchant 112(1) can interact with (e.g., select) a drop-down menu 222 to reveal a list of predefined locations within the virtual space corresponding to the XR storefront that the merchant 112(1) can choose from to position the selected item within the virtual space. The merchant 112(1) may be able to indicate the positions of any suitable number of the selected items by selecting the "+Add" element. In some examples, if the merchant 112(1) does not complete the fourth step, the selected items may be positioned within the XR storefront at random or based on any suitable criteria, such as alphabetically, the order in which the items were selected at the second step, or the like. As mentioned above, the merchant 112(1) may upload image data representing still images and/or videos of their brick-and-mortar store (e.g., images of the inside or interior thereof), and the real-world locations of identified items within the brick-and-mortar store may be provided as input to the XR storefront service 110 to automatically position the digital representations of the items at corresponding positions within the XR storefront (e.g., by positioning the digital representations of the items in the XR storefront relative to where they are positioned in real life). In some examples, the user interface 200 may present an option to confirm, correct, and/or reject these automatically determined locations of items within the XR storefront. In some examples, the XR storefront service 110 may be able to access data (e.g., customer data, merchant data, etc.) from various channels based on the server(s) 114 providing additional services to merchants 112 and customers 102. For example, the XR storefront service 110 may have access to purchase data, sales data, or the like, which may be processed to determine sale metrics (e.g., how well items have sold instore, online, etc.), and the XR storefront service 110 may automatically position better-selling items towards a front and/or an entrance to the XR storefront so that the best-selling items are featured right away to users as they enter the XR storefront. In some examples, the XR storefront service 110 may automatically position items that aren't selling well in a "sale section" of the XR storefront in an attempt to clear inventory. In some examples, the XR storefront service 110 may access website data associated with a website of the merchant 112(1) to determine which items are prominently featured on the website, and the XR storefront service 110 may automatically position those featured items towards a front and/or an entrance to the XR storefront. In some examples, the user interface 200 may be configured to pre-select items and/or locations for the items based at least in part on how the items are arranged on a website of the merchant 112(1) and/or how the items are arranged in a catalog of the merchant 112(1). Accordingly, a user does not have to select from a long list of items and/or locations at the encircled number 4 in FIG. 2 in implementations where the items and/or locations thereof are preselected for the user. In some examples, the drop-down menu(s) 220 and/or 222, when selected, may reveal categories of items and/or categories of locations to help a user quickly identify an item and/or a location thereof. In some examples, a recommendation engine may access data associated with other merchants 112 who have implemented XR storefronts to determine merchant type codes, item types, store templates selected, etc., and the recommendation engine may recommend items and/or locations for the items based on the data associated with the other merchants 112.

As illustrated by the encircled number 5 in FIG. 2, a fifth step may be to configure a merchant avatar to represent a user (e.g., the clerk 104 in FIG. 1) associated with the merchant 112(1) within the XR storefront. That is, the merchant 112(1) may employ users, such as the clerk 104, to access the XR storefront to interact with customers within the XR storefront. Accordingly, when a customer 102 accesses the XR storefront at the same time that a clerk 104 is accessing the same XR storefront, the customer 102 may see a merchant avatar within the XR storefront. The fifth step in the example of FIG. 2 is to configure such a merchant avatar. The merchant 112(1) may be able to select from a menu of predefined avatars and/or create a new avatar by selecting features, such as height, weight, hair color, eye color, skin color, or the like. If the merchant 112(1) does not complete the fifth step, a default avatar may be chosen for users (e.g., clerks 104) associated with the merchant 112(1).

As illustrated by the encircled number 6 in FIG. 2, a sixth, and possibly final, step may be to activate the XR storefront by selecting an "activate XR storefront" button 224. This may cause storefront data 126 representing the XR storefront (and possibly avatar data representing the merchant avatar(s)) to be stored in the datastore(s) 120 for access at runtime. It is to be appreciated that the merchant 112(1) may additionally, or alternatively, have the option to save their progress without activating the XR storefront, this may cause the storefront data 126 (and possibly avatar data) to be stored, but the stored data may not be usable to make the XR storefront available to end users until the merchant 112(1) activates the XR storefront. In some examples, the merchant 112(1) may be able to activate and deactivate the XR storefront on demand.

Figure 3:
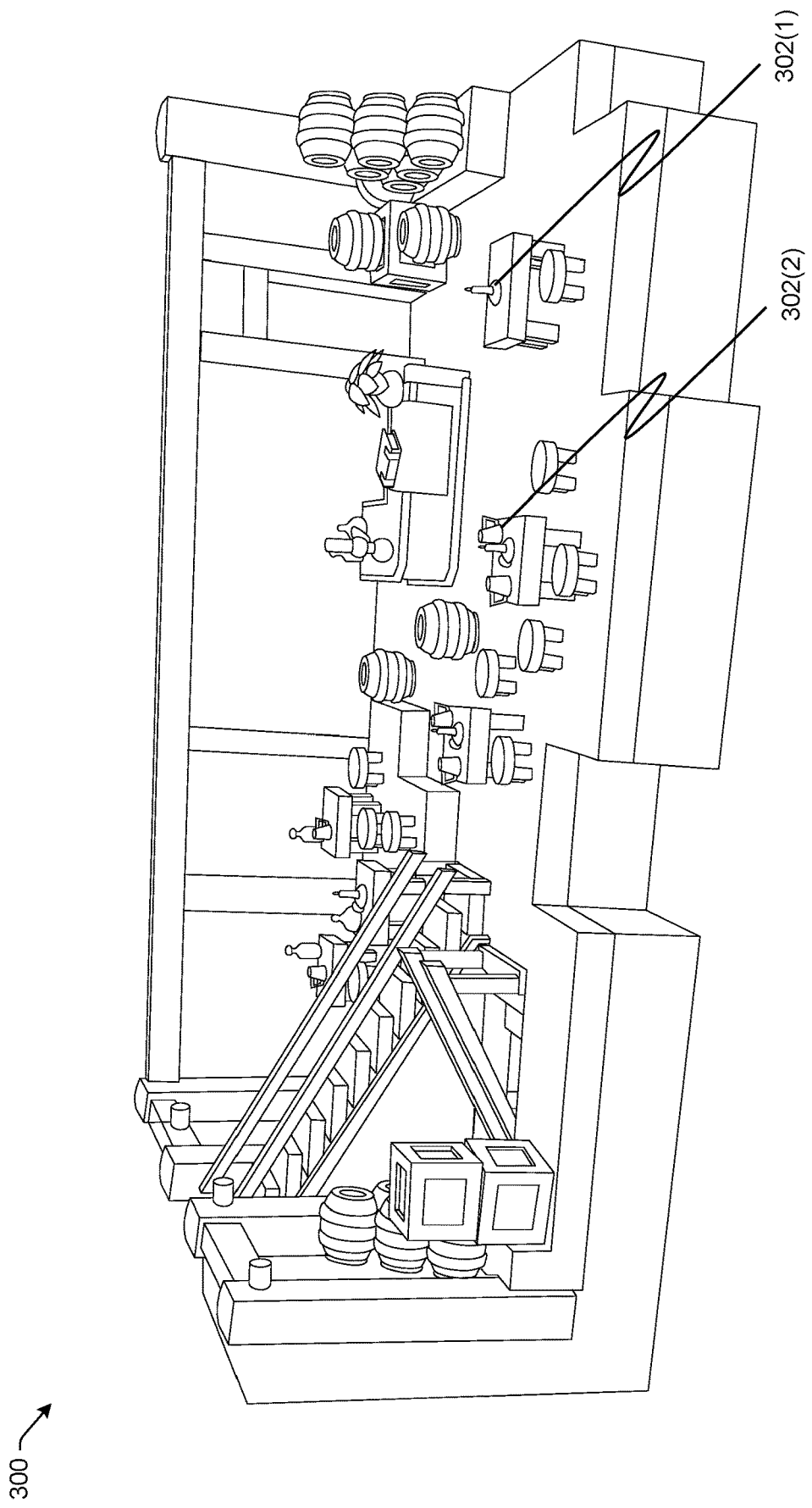
FIG. 3 is an example three-dimensional (3D) model of a virtual space corresponding to a XR storefront, according to an implementation of the present subject matter.

FIG. 3 is an example 3D model 300 of a virtual space corresponding to a XR storefront, according to an implementation of the present subject matter. For example, as a result of the merchant 112(1) configuring a XR storefront (e.g., via the user interface 200 of FIG. 2), the storefront data 126 representing the XR storefront may include the data corresponding to the 3D model 300 shown in FIG. 3. Any suitable component can be used to create the 3D model 300. For example, the 3D model 300 may be created using Blender. FIG. 3 also illustrates how digital representations 302 of items showcased in the XR storefront may be positioned within the virtual space. For example, FIG. 3 shows a first digital representation 302(1) of a candle for sale by the merchant 112(1), which is positioned at a first position within the virtual space, and a second digital representation 302(2) of a mug for sale by the merchant 112(1), which is positioned at a second, different position within the virtual space. These respective positions of the digital representations 302 within the virtual space may be based on the positioning indications received from the merchant 112(1) at the fourth step in the example of FIG. 2. In other words, the merchant 112(1) may have chosen the positions of the digital representations 302(1) and 302(2) within the virtual space. Accordingly, the digital representations 302(1) and 302(2) may be associated with respective positions within the virtual space based at least in part on the 3D model 300, and these associations may be included in the storefront data 126 representing the XR storefront.

Figure 4:
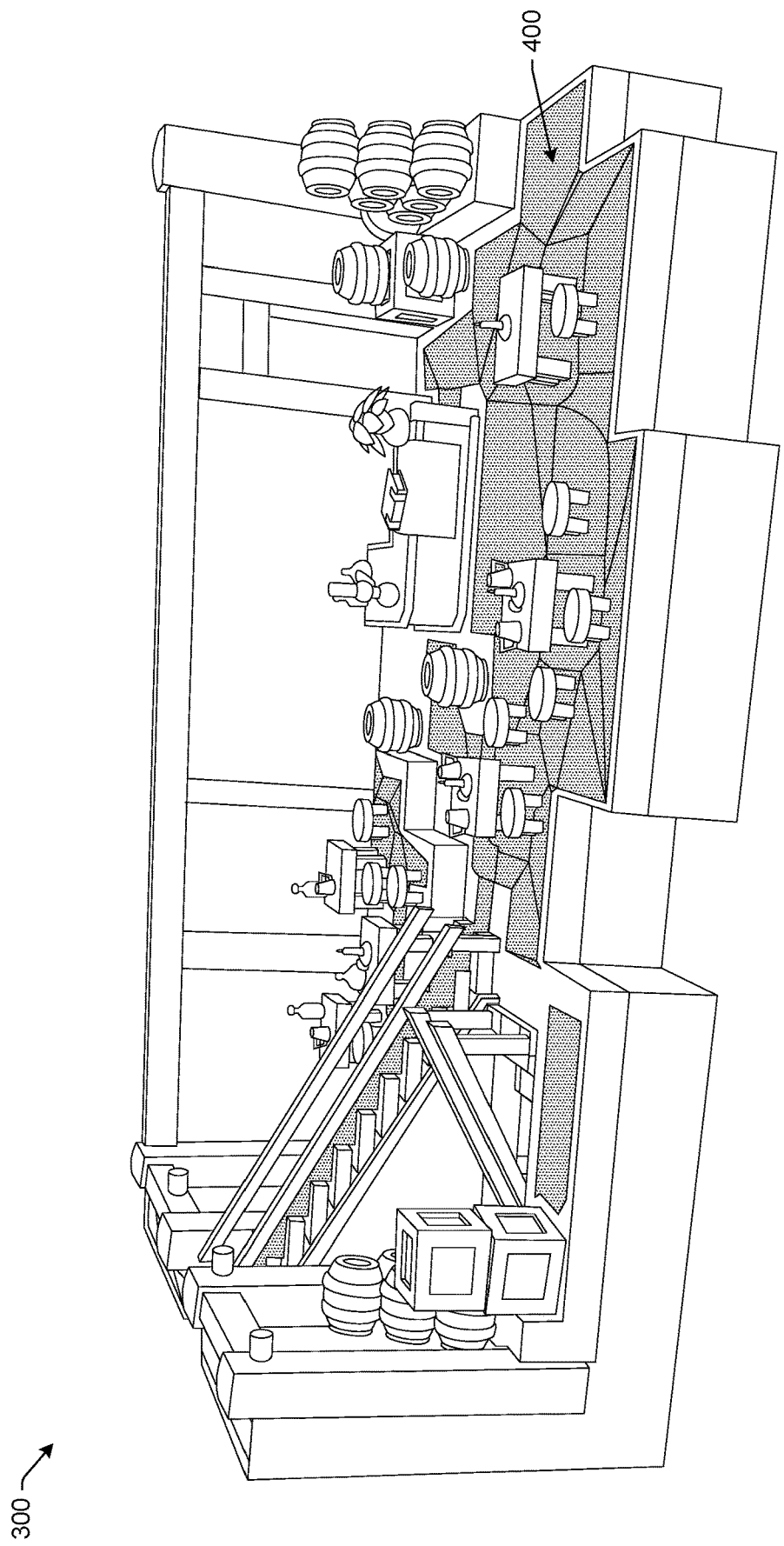
FIG. 4 is an example 3D model of a virtual space corresponding to a XR storefront with a navigation mesh applied to the 3D model to constrain avatar movement within the virtual space, according to an implementation of the present subject matter.

FIG. 4 is an example 3D model 300 of a virtual space corresponding to a XR storefront, the 3D model 300 having applied thereto a navigation mesh 400 to constrain avatar movement within the virtual space, according to an implementation of the present subject matter. A navigation mesh 400 may be applied to a 3D model 300 to constrain the movement of avatars within the virtual space corresponding to the XR storefront. In the example of FIG. 4, the navigation mesh 400 is shown as a shaded area on the floor of the 3D model 300, but this is exemplary. If a user, such as the customer 102 or the clerk 104, accesses the XR storefront associated with the 3D model 300 depicted in FIG. 4 with the navigation mesh 400 applied thereto, the avatar of the user may be allowed to walk in the shaded area of the navigation mesh 400, but may be unable to walk outside of the shaded area of the navigation mesh 400. This navigation mesh 400 may help prevent anomalous events and errors from occurring during a XR experience. In some examples, a determination is made as to where to position the navigation mesh 400 on, in, or with respect to the 3D model 300 and/or the XR storefront. For example, the XR storefront service 110 may determine where digital objects (e.g., tables, chairs, display cases, clothing racks, etc.) are positioned on a floor of the 3D model 300, and, based on the floor locations of, and/or the area of the floor covered by, those digital objects, the XR storefront service 110 may determine how to apply the navigation mesh 400 to the 3D model 300. For example, the XR storefront service 110 may avoid positioning the navigation mesh 400 on the areas of the floor that are covered by digital objects (e.g., tables, chairs, display cases, clothing racks, etc.) of the 3D model 300. In some examples, the XR storefront service 110 may analyze the 3D model 300 to determine open floor areas that are contiguous with each other and with an entrance and/or an exit of the XR storefront, and the navigation mesh 400 may be applied to, or positioned on, the contiguous open-floor areas so that an avatar is able to enter the XR storefront, traverse the navigation mesh 400, and exit the XR storefront without getting "stuck" on an island of the navigation mesh 400 that is not connected to the entrance and/or the exit. In some examples, the navigation mesh 400 may be modified by a user to expand or shrink the navigation mesh 400, and/or to change a path along which avatars may traverse the XR storefront.

Figure 5:
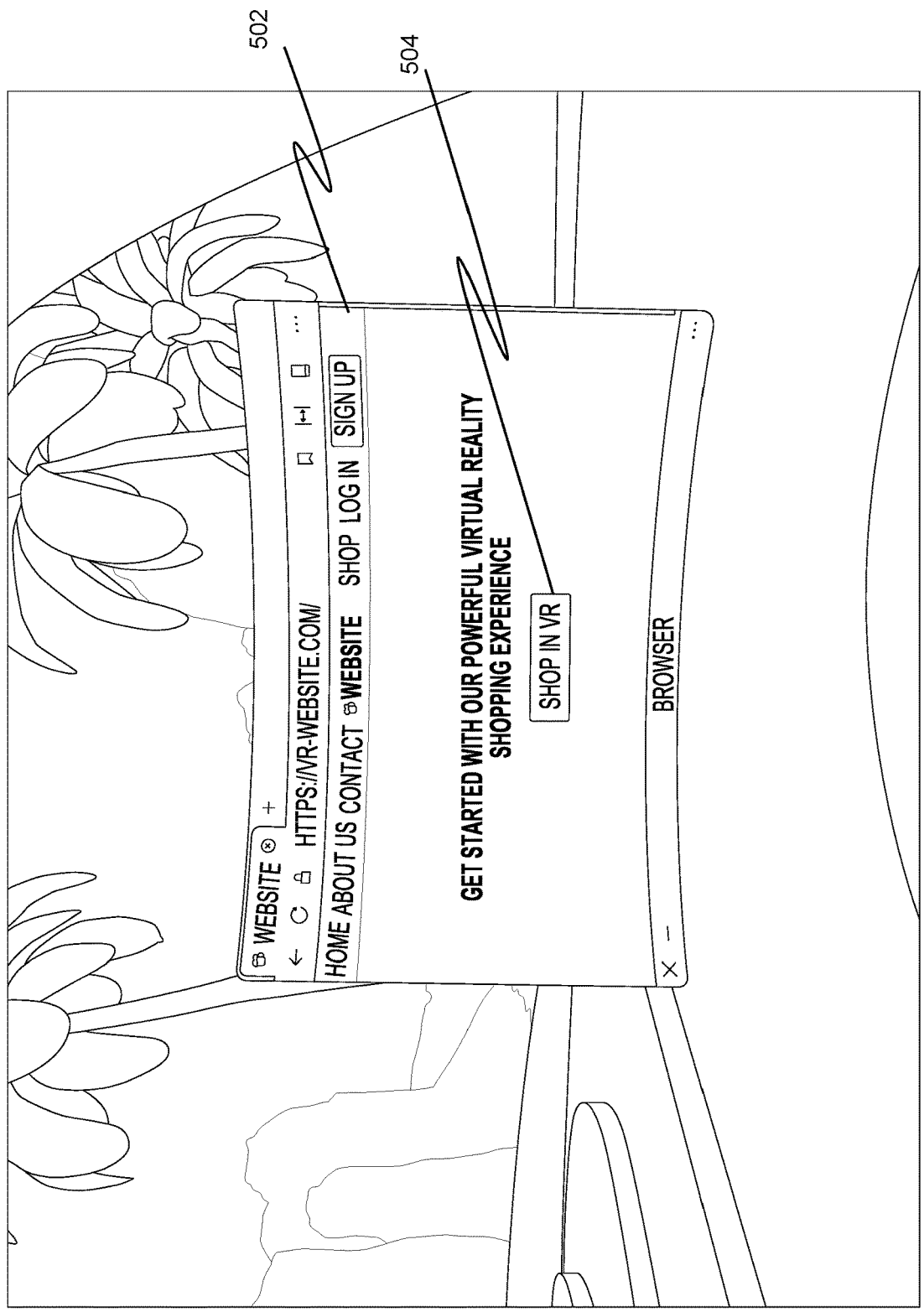
FIG. 5 is an example user interface for accessing VR storefronts on an electronic device, according to an implementation of the present subject matter.

FIGS. 5-9 depict example user interfaces for accessing a VR storefront, where a VR storefront is one example of a XR storefront. Although the XR storefront service 110 is described as a VR storefront service 110 below with reference to the examples of FIGS. 5-9, it is to be appreciated that the examples of FIGS. 5-9 are not limited to VR technology. That is, the examples of FIGS. 5-9 may be implemented by the XR storefront service 110 using any suitable XR technology including VR, AR, MR, or the like. FIG. 5 is an example user interface 500 for accessing a VR storefront on an electronic device, according to an implementation of the present subject matter. For example, the user interface 500 may represent a user interface that is presented on a display of the electronic device 106(1) (e.g., a VR headset) of the customer 102 when the customer 102 is about to access a VR storefront. As shown in FIG. 5, the customer 102 has opened a browser 502 on the electronic device 106(1) and has entered a URL (e.g., "https:/NR-Webiste.com") into the browser 502, which may cause the server(s) 114 to serve the web page depicted in FIG. 5. The example web page in FIG.

5 includes an interactive element 504 that, upon selection, allows the customer 102 to enter a VR shopping experience where the customer can request to access a VR storefront, and, in response, the VR storefront service 110 causes the browser 502 to display the requested VR storefront.

Figure 6:
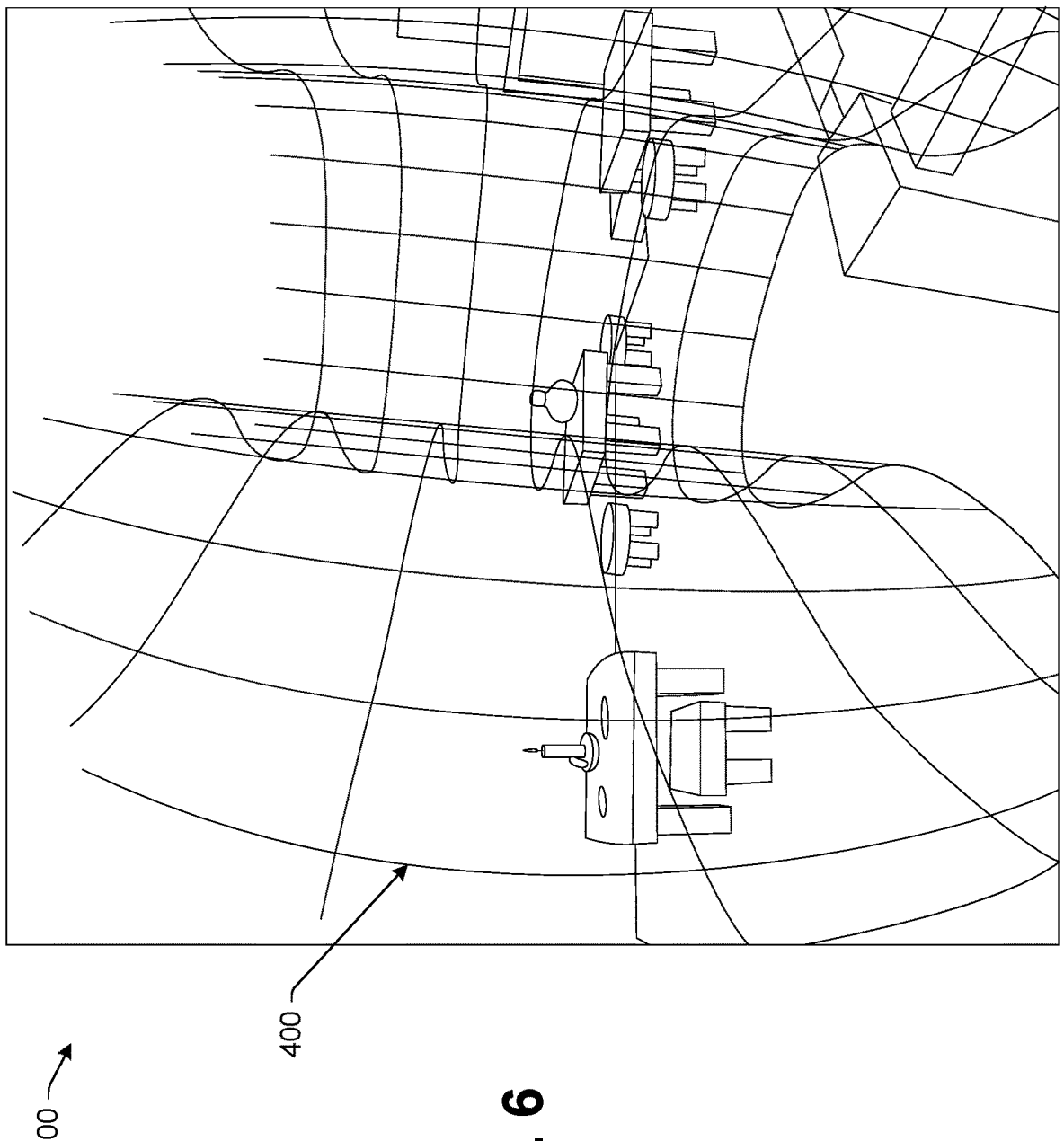
FIG. 6 is an example user interface of a virtual space corresponding to a VR storefront, the user interface depicting a navigation mesh to constrain avatar movement within the virtual space, according to an implementation of the present subject matter.

FIG. 6 is an example user interface 600 of a virtual space corresponding to a VR storefront, the user interface 600 depicting a navigation mesh 400 to constrain avatar movement within the virtual space, according to an implementation of the present subject matter. It is to be appreciated that navigation mesh 400 may not be displayed when a VR storefront is displayed on an electronic device 106, 108 of a user 102, 104. However, the navigation mesh 400 is shown in the example user interface 600 if FIG. 6 to further illustrate how the navigation mesh 400 can be used to constrain avatar movement within the virtual space corresponding to the VR storefront. In other words, user who is accessing the VR storefront may be prohibited from moving to areas of the virtual space that are on the other side of the navigation mesh 400 shown in the user interface 600, and may be constrained to moving within areas of the virtual space that are within the navigation mesh 400. This effectively channels the user's movements within the virtual space, preventing the user's avatar from moving into a prohibited area of the VR storefront.

Figure 7:
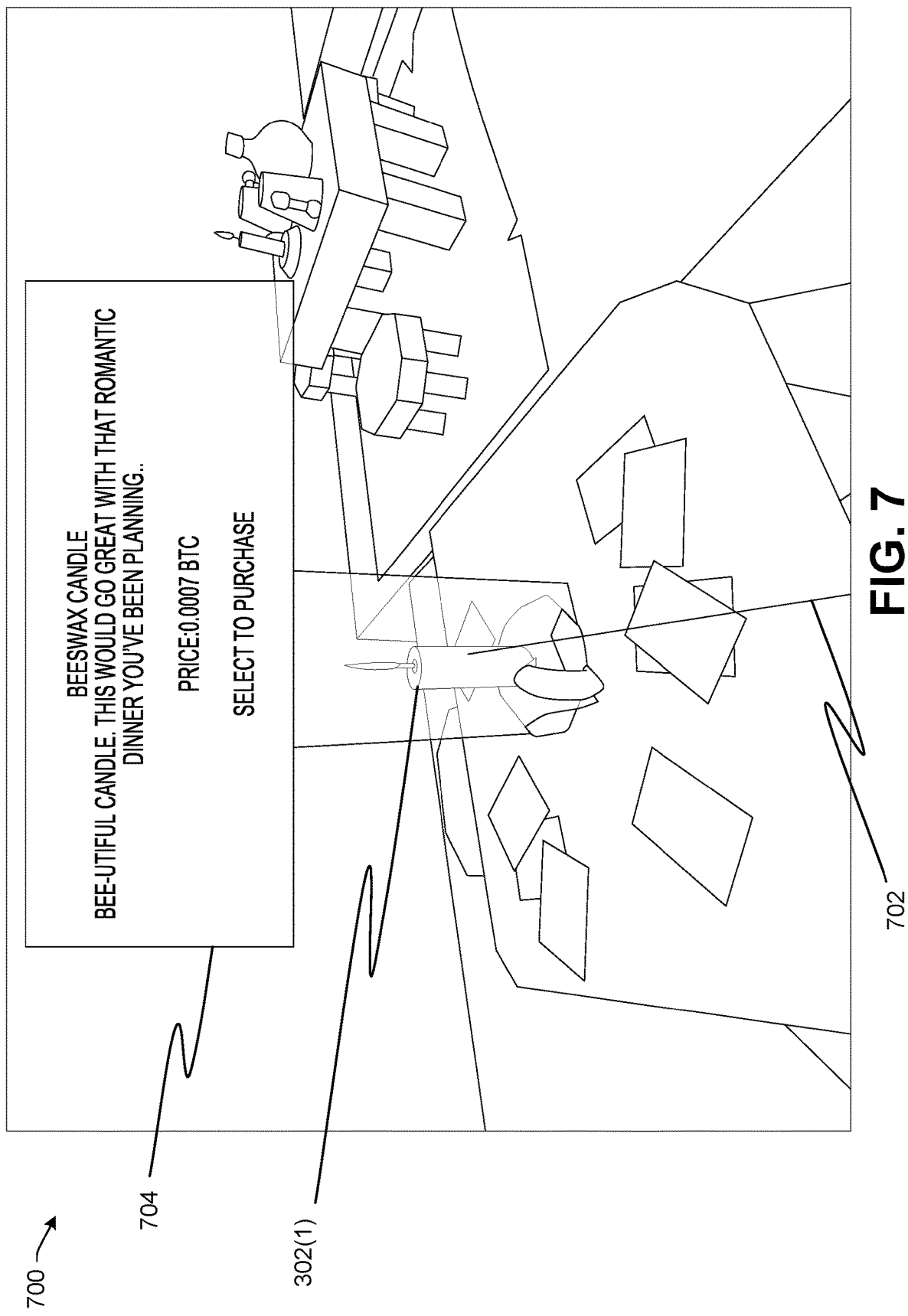
FIG. 7 is an example user interface depicting a customer browsing a digital representation of an item within a VR storefront, according to an implementation of the present subject matter.

FIG. 7 is an example user interface 700 depicting a customer 102 browsing a digital representation 302(1) of an item (e.g., a candle) within a VR storefront, according to an implementation of the present subject matter. In other words, the user interface 700 may represent a VR storefront that is displayed on an electronic device 106 of the customer 102 at a time when the customer 102 is evaluating an item (e.g., a candle) showcased in the VR storefront. The digital representation 302(1) of the item (e.g., a candle) shown in FIG. 7 is an example of a 3D representation of the item, which can be based at least in part on scan data obtained from scanning the item (e.g., the candle) in a real-world space. The customer 102 can virtually "walk" around the 3D digital representation 302(1) of the item and/or virtually "pick up" the 3D digital representation 302(1) of the item to examine the item from different angles. This is an improvement over traditional online shopping experience where a customer has to click through static, 2D images of items. The ability to evaluate a 3D digital representation 302(1) of an item is also an improvement over a video demonstration, which the customer does not have control over. In the example of FIG. 7, the customer 102 can evaluate the appearance of the item from any desired angle within a VR storefront that mimics a realistic experience of browsing for items in a brick-and-mortar store.

In some examples, the customer 102 may utilize a user input device of, or associated with, the electronic device 106 to provide user input indicative of browsing and purchase intents within the VR storefront. For example, the customer 102 may use a user input device to "hover" a pointer 702 on the user interface 700 over the digital representation 302(1) of the item to reveal item details 704 associated with the item. In an example where the electronic device 106 is a head-mounted display 106(1) (e.g., a VR headset), the customer 102 may operate a handheld controller by extending his/her arm forward to move the pointer 702 (e.g., a laser control) over the digital representation 302(1) of the item. In another example where the electronic device 106 is a desktop PC 106(N), the customer 102 may operate a mouse to move the pointer 702 over the digital representation 302(1) of the item. When the pointer 702 is hovering over the digital representation 302(1) of the item, item details 704 may be revealed, such as by the user interface 700 presenting the item details 704 in a pop-up window adjacent to the digital representation 302(1) of the item. In the example of FIG. 7, the item details 704 include a description of the item and a price of the item. It is to be appreciated that additional or fewer item details 704 may be presented when the customer 102 indicates an interest in the item. The example price of the item shown in FIG. 7 is specified in bitcoin. This is merely an example, and it is to be appreciated that the price of the item may be specified in any suitable type of currency, including fiat currency, cryptocurrencies, rewards points, etc. Benefits of transacting in VR storefronts using cryptocurrencies include preservation of anonymity and a lack of a central authority (e.g., a bank) to authorize a payment, which provides customers with economic empowerment. The item details 704 may further indicate, to the customer 102, how to add the item to a cart and/or purchase the item (e.g., "select to purchase"). In some examples, the VR storefront service 110 may be able to access data (e.g., customer data, merchant data, etc.) from various channels based on the server(s) 114 providing additional services to merchants 112 and customers 102. For example, the VR storefront service 110 may have access to website data associated with a website of a merchant 112 that is associated with the VR storefront and/or the item represented by the digital representation 302(1) depicted in FIG. 7. In this example, the VR storefront service 110 may cause the user interface 700 to present an option to open or otherwise launch the merchant's 112 website (e.g., an ecommerce website) and/or to obtain additional item details 704 about the item from the merchant's 112 website, such as one or more additional images, specifications associated with the item, customer reviews, etc. The additional item details 704 can be presented in a pop-up window and/or the user may be redirected (e.g., via a browser) to another user interface(s) where the user can view the additional item details and/or the website of the merchant 112.

Figure 8:
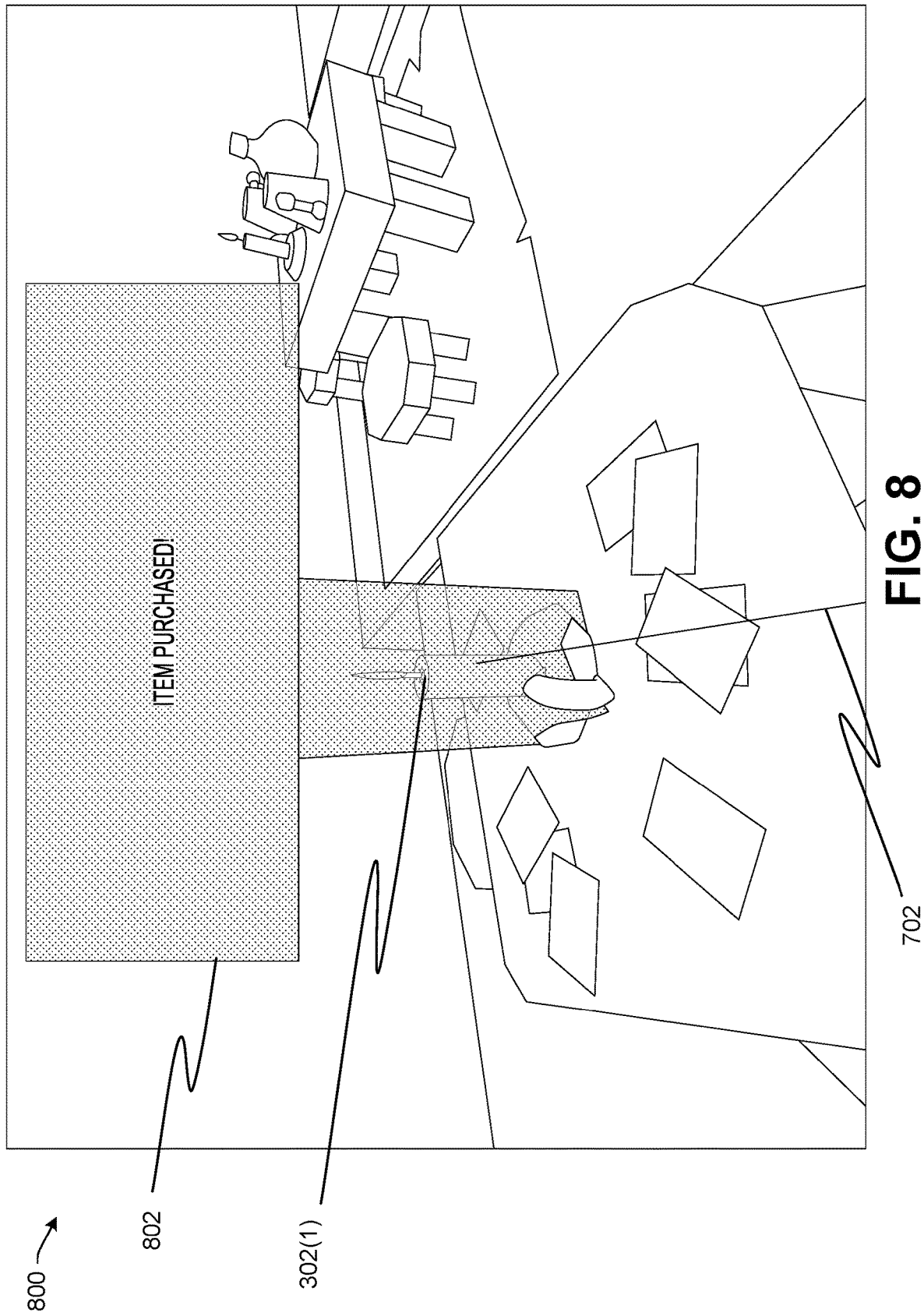
FIG. 8 is an example user interface depicting an updated purchase status of an item after a customer has purchased the item from within a VR storefront, according to an implementation of the present subject matter.

FIG. 8 is an example user interface 800 depicting an updated purchase status of an item after a customer 102 has purchased the item from within a VR storefront, according to an implementation of the present subject matter. As mentioned above, the customer 102 may utilize a user input device of, or associated with, the electronic device 106 to provide user input indicative of purchase intents within the VR storefront. For example, the customer 102 may provide user input indicative of a selection of the digital representation 302(1) of the item (e.g., the candle) to indicate a purchase intent. In an example where the electronic device 106 is a head-mounted display 106(1) (e.g., a VR headset), the customer 102 may operate a handheld controller by pressing a button on the handheld controller while the pointer 702 (e.g., a laser control) is hovering over the digital representation 302(1) of the item. In another example where the electronic device 106 is a desktop PC 106(N), the customer 102 may operate a mouse by pressing the a button (e.g., the left mouse button) while the pointer 702 is hovering over the digital representation 302(1) of the item. The server(s) 114 may receive user input data from the electronic device 106, the user input data indicating a selection of the digital representation 302(1) of the item, and, in response, the server(s) 114 may update a purchase status of the item in the datastore(s) 120. After updating the purchase status of the item, the server(s) 114 may cause the electronic device 106 to display the digital representation 302(1) of the item within the VR storefront in association with an indication 802 that the item has been purchased (e.g., by the customer 102) based on the purchase status of the item. The indication 802 that the item has been purchased may be displayed for any suitable period of time. In some examples, the indication 802 is displayed for the duration of a current session. In this example, if the customer 102 leaves the VR storefront or otherwise ends their current session, the indication 802 may no longer be displayed when the customer 102 returns to the VR storefront (e.g., the customer 102 may see the user interface 700 in a subsequent session where the customer 102 accesses the VR storefront, despite the customer 102 having purchased the item in a previous session associated with the VR storefront). In some examples, the indication 802 is displayed for longer periods of time, such as over the course of multiple sessions and/or during multiple subsequent visits to the VR storefront by the customer 102. For example, if the customer 102 leaves the VR storefront or otherwise ends their current session, the customer 102 may see the indication 802 that they purchased the item when the customer 102 returns to the VR storefront in a subsequent session. This may be helpful to remind the customer 102 that they already purchased the item, so that they don't purchase the same item again, or to assist the customer 102 with quickly finding an item that they would like to replace (e.g., purchase a second time). In some examples, a user interface (e.g., the user interface 800) may display an option for the customer 102 to toggle between showing items that the customer 102 purchased (e.g., during the current session, over one or more past sessions, etc.) and not showing such purchase information. For example, the customer 102 may be able to activate/deactivate a virtual lens such that when the virtual lens is activated, the customer 102 can see, via a user interface, which items they have purchased during the current session and/or over any number of past sessions (e.g., past visits to the VR storefront).

Any suitable techniques for authorizing a payment and/or authenticating the customer 102 to complete the transaction may be implemented. In some examples, a Web5 platform is utilized for anonymous authentication to authorize a payment. In other examples, the customer 102 may have setup a payment instrument (e.g., a credit card, debit card, prepaid card, etc.) with the VR storefront service 110, and/or the customer 102 may have an account associated with a payment processing service or a payment application, and funds may be withdrawn from the account to facilitate a transaction for an item within the VR storefront.

In examples where the XR storefront service 110 is implemented as an AR storefront service 110 that is configured to cause AR storefronts to be presented on electronic devices 106, various features and functionality relating to AR can be implemented. For example, 3D models (textures) can be overlaid over a real product in a brick-and-mortar store. This may allow for displaying, to a customer 102, different versions of an item (e.g., different stock keeping units (SKUs) that are associated with different colors, designs, and/or styles of a particular item). Accordingly, a merchant 112 does not need to stock each version (e.g., SKU) of an item on the shelves or display cases of a brick-and-mortar store, and customers can conveniently toggle through different colors, designs, etc. of an item that are visible via changes to the 3D texture overlay atop the item in an AR storefront implementation. In some examples, additional information (e.g., item specifications, features, etc.) can be overlaid on top of an item when viewed in an AR storefront to provide more information about the item. In some examples, physical mirrors in a brick-and-mortar store may be outfitted with one or more depth cameras and one or more displays to allow a customer to visualize what an item (e.g. a dress) would look like if the customer were to wear the item. In these examples, the depth camera(s) may track the body of the customer and the display(s) may overlay a 3D model of the item on top of the customer's body. Thus, when the customer selects an item and looks in the mirror, it may appear, to the customer, that they are wearing the selected item (e.g., an item of clothing). In some examples, the merchant 112 may provide real-world clothing that improves the tracking performance of the depth camera(s), such as solid color clothing.

Figure 9:
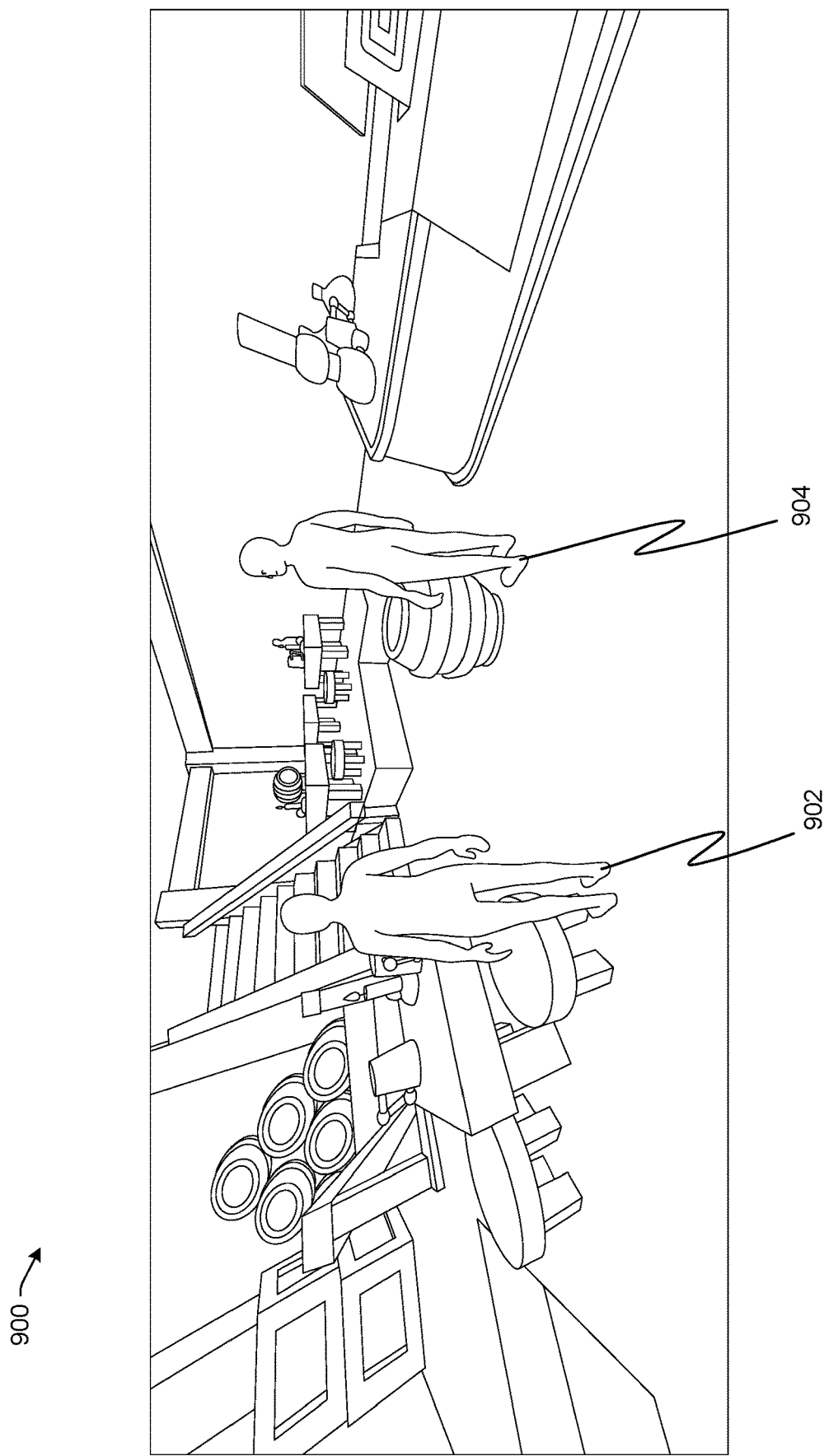
FIG. 9 is an example user interface of a virtual space corresponding to a VR storefront, the virtual space including avatars of other users who are also accessing the VR storefront at the same time as the viewing user, according to an implementation of the present subject matter.

FIG. 9 is an example user interface 900 of a virtual space corresponding to a VR storefront, the virtual space including avatars, such as the avatar 902 and the avatar 904, of other users who are also accessing the VR storefront at the same time as the viewing user, according to an implementation of the present subject matter. As mentioned above, in some examples, the VR storefront service 110 provides multi-user support to enable interactions between users 102, 104 within the VR storefront. For example, a merchant 112 (e.g., a user, such as a clerk 104, associated with the merchant 112) can interact with customers while the customers are accessing the VR storefront, and/or friends can shop together in a VR storefront even though they are located in disparate geographical locations. This provides an interactive experience where the customers can interact with each other and with one or more users (e.g., clerks 104) associated with the merchant 112.

At runtime, multiple users may be accessing a common VR storefront. In the example of FIG. 9, the viewing user who is viewing the user interface 900 on his/her electronic device 106 may represent a first customer 102. Because the first customer 102 can see two avatars 902 and 904 within the VR storefront, a second customer 102 associated with the first avatar 902 (customer avatar 902) may be accessing the VR storefront at the same time as the first customer 102, and a clerk 104 associated with the second avatar 904 (merchant avatar 904) may be accessing the VR storefront at the same time as the first and second customers 102. While these users 102, 104 are accessing the VR storefront, their respective electronic device 106, 108 stream device data (e.g., position data) to the server(s) 114. In an example where the users 102, 104 are using head-mounted displays (e.g., VR headsets), this device data (e.g., position data) may be based on the movement of the users 102, 104 within their respective environments, enabled by VR tracking technology. In an example have the users 102, 104 are using desktop PCs, the device data (e.g., position data) may be based on user input provided to a mouse and/or keyboard indicative of the user intent to move about the VR storefront from one position to another. Upon receiving device data from an electronic device 108 associated with the clerk 104, for example, the server(s) 114 may determine, based at least in part on the device data, a position of the merchant avatar 904 within the virtual space corresponding to the VR storefront, and may cause the VR storefront to be displayed on the electronic device 106 of the first customer with the merchant avatar 904 positioned at the determined position within the virtual space. Likewise, upon receiving device data from an electronic device 106 associated with the second customer, the server(s) 114 may determine, based at least in part on the device data, a position of the customer avatar 902 within the virtual space corresponding to the VR storefront, and may cause the VR storefront to be displayed on the electronic device 106 of the first customer with the customer avatar 902 positioned at the determined position within the virtual space. As device data is streamed from the respective electronic devices 106, 108 to the server(s) 114, the server(s) 114 can keep track of the updated positions of the respective users 102, 104 and update the 3D scenes displayed to each user 102, 104, as well as the positions of the avatars within those rendered 3D scenes. The server(s) 114 can use any suitable component(s) to support multi-user interactions, such as Socket.IO, EasyRTC, or the like. In general, the component(s) used by the server(s) 114 may enable users 102, 104 to interact with one another within VR storefronts. In this manner, different customers may be able to see each other and interact with one another within the VR storefront, and the customers presently accessing the VR storefront can interact with the merchant (e.g., the clerk(s) 104) who is also accessing the VR storefront.

In some examples, users 102, 104 accessing a VR storefront can utilize user input devices to provide user input indicative of an interaction with an avatar that is displayed within the VR storefront. For example, the first customer 102 in the example of FIG. 9 (i.e., the viewing user) may speak into a microphone of his/her electronic device 106 in order to talk to another user(s) associated with the avatars 902 and/or 904. When this occurs, the server(s) 114 receives interaction data (e.g., audio data) from the electronic device 106 of the first customer 102, indicating an interaction of the first customer 102 with the avatar 902 and/or 904, and the server(s) 114 may send (e.g., stream) this interaction data to the electronic device(s) 106, 108 of the user(s) 102, 104 associated with the avatar(s) 902, 904. In other words, interaction data (e.g., audio data) may be synchronized across the user electronic devices 106, 108 to allow the users 102, 104 to interact with one another within the VR storefront. In a buyer-seller interaction, for example, the clerk 104 associated with the merchant avatar 904 may interact with either or both customers in the VR storefront by speaking into the microphone on his/her electronic device 108 to say something like "Hey, welcome to Merchant A, how are you all doing today?." Because the audio is streamed in real-time, or near-real-time, across the user electronic devices 106, 108 via the server(s) 114, the customers 102 may hear, via the speakers of their respective electronic devices 106, the clerk 104 speaking, and the first customer 102, for example, may respond by saying something like "I'm doing well, thank you." Accordingly, a dialogue may ensue in real-time to mimic an interaction that a customer 102 is familiar with whilst shopping in a brick-and-mortar store. As another example, the two customers 102, who might be friends located in different geographical locations, can interact with one another, such as by speaking. For instance, the second customer 102 associated with the customer avatar 902 might virtually try on a digital representation of a shirt and may say to the first customer 102 (i.e., the viewing user) something like "What do you think of this shirt on me?" Again, this mimics real-life experiences to drive customer engagement with VR storefronts of merchants.

In some examples, the VR storefront service 110 is configured to determine whether or not to send (e.g., stream) interaction data to the electronic device(s) 106, 108 and/or which electronic device(s) 106, 108 to send (e.g., stream) the interaction data to. For example, audio data may be selectively sent (e.g., streamed) to particular electronic device(s) 106, 108 to allow certain users to "overhear" conversations (e.g., conversations between a customer and a clerk, between two customers, between two clerks, etc.), and/or to prevent certain users from "overhearing" such conversations. In some examples, users 102, 104 may be allowed to toggle between hearing other conversations or not hearing other conversations, and/or letting others hear their conversations or preventing others from hearing their conversations. In some examples, a determination of whether to send (e.g., stream) interaction data (e.g., audio data) to a particular electronic device(s) 106, 108 is proximity based. For instance, if a customer's 102 avatar is within a threshold distance of avatars that are interacting with each other within the VR storefront, interaction data associated with the interacting avatars may be streamed to the electronic device 106 of the customer 102 whose avatar is proximate to the interacting avatars. By contrast, other customers 102 who are not within the threshold distance of the interacting avatars may be unable to see and/or hear the interaction between the interacting avatars. In some examples, whether to send (e.g., stream) interaction data (e.g., audio data) to a particular electronic device(s) 106, 108 is based at least in part on a direction that an avatar(s) is/are facing. For example, if a customer's 102 avatar is facing avatars that are interacting with each other within the VR storefront, the interaction data associated with the interacting avatars may be streamed to the electronic device 106 of the customer 102, and the interaction data may cease to be streamed to the electronic device 106 in response to the customer's 102 avatar turning away from the interacting avatars.

In some examples, an automated help feature may be implemented. For instance, in addition to a merchant avatar 904 associated with a clerk 104, and/or in instances where there are no clerks 104 accessing the VR storefront, a customer 102 may invoke an automated help feature, which may be implemented as an artificial intelligence (AI) assistant to provide question and answer functionality using natural language processing and/or a machine learning model(s) that is trained to engage in a dialogue with a human user. In some examples, the VR storefront service 110 is configured to analyze interactions of users 102, 104 with digital representations of items within the VR storefront and perform actions based on the analysis of those interactions. For example, if an avatar 902 picks up an item in the VR storefront and is examining the item from different angles (e.g., by turning the digital representation of the item in different orientations), the VR storefront service 110 may cause display, on the user electronic device 106, 108, of higher-resolution images of the items and/or a pop-up option that is selectable for the user 102, 104 to access additional imagery (e.g., images, videos, etc.) associated with the item that the user 102, 104 is currently examining from different angles.

In addition to synchronizing interaction data (e.g., audio data) across the user electronic devices 106, 108, shared object state may be synchronized across the user electronic devices 106, 108 as well. For example, if the first customer 102 (i.e., the viewing user) purchases an item within the VR storefront, the second customer 102 associated with the customer avatar 902 may see, when viewing the digital representation of the purchased item, that the first customer has purchased the item. In some examples, if the merchant 112 has a limited inventory of items, the shared object state may indicate, to the users 102, 104 accessing the VR storefront, that there are only a certain number of a given item left in stock. In some examples, inventory information (e.g., a number of items remaining in stock) is presented via a user interface to a customer 102 regardless of whether shared object state is synchronized across user electronic devices 106, 108 or not. If an item is out of stock, the VR storefront may still include a digital representation of the out-of-stock item along with an indication that the item is back-ordered so that a customer 102 can purchase the item, but delivery of the item may take longer than usual. In some examples, out-of-stock items are hidden from view (e.g., concealed, removed from the VR storefront, etc.), or out-of-stock items can be converted into background decor of the VR storefront and rendered unpurchasable such that a customer 102 cannot purchase an out-of-stock item. In some examples, when an item goes out-of-stock, the digital representation of the item in the VR storefront is automatically replaced with a digital representation of a different item (e.g., an item that was not included in the VR storefront initially due to space constraints, to avoid cluttering the VR storefront, etc.).

The avatars 902, 904 may be human-like in form such that, when they are configured, the avatars, such as the customer avatars 902, may have similar sizing to the customers associated with those avatars. For example, the avatars 902 may be configured to have the same height, weight, neck size, waist size, chest size, and the like, as their corresponding customers. This may allow for evaluating clothing items within the VR storefronts. For example, a customer may be able to virtually try on clothes in a VR storefront to see if they fit. Such an experience may mimic a real-world shopping experience to drive customer engagement with VR storefronts.

The user interfaces 200, 500, 600, 700, 800, and 900 are provided as examples of user interfaces that can be presented to facilitate techniques described herein. User interfaces can present additional or alternative data in additional or alternative configurations. That is, user interfaces 200, 500, 600, 700, 800, and 900 should not be construed as limiting.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 10:
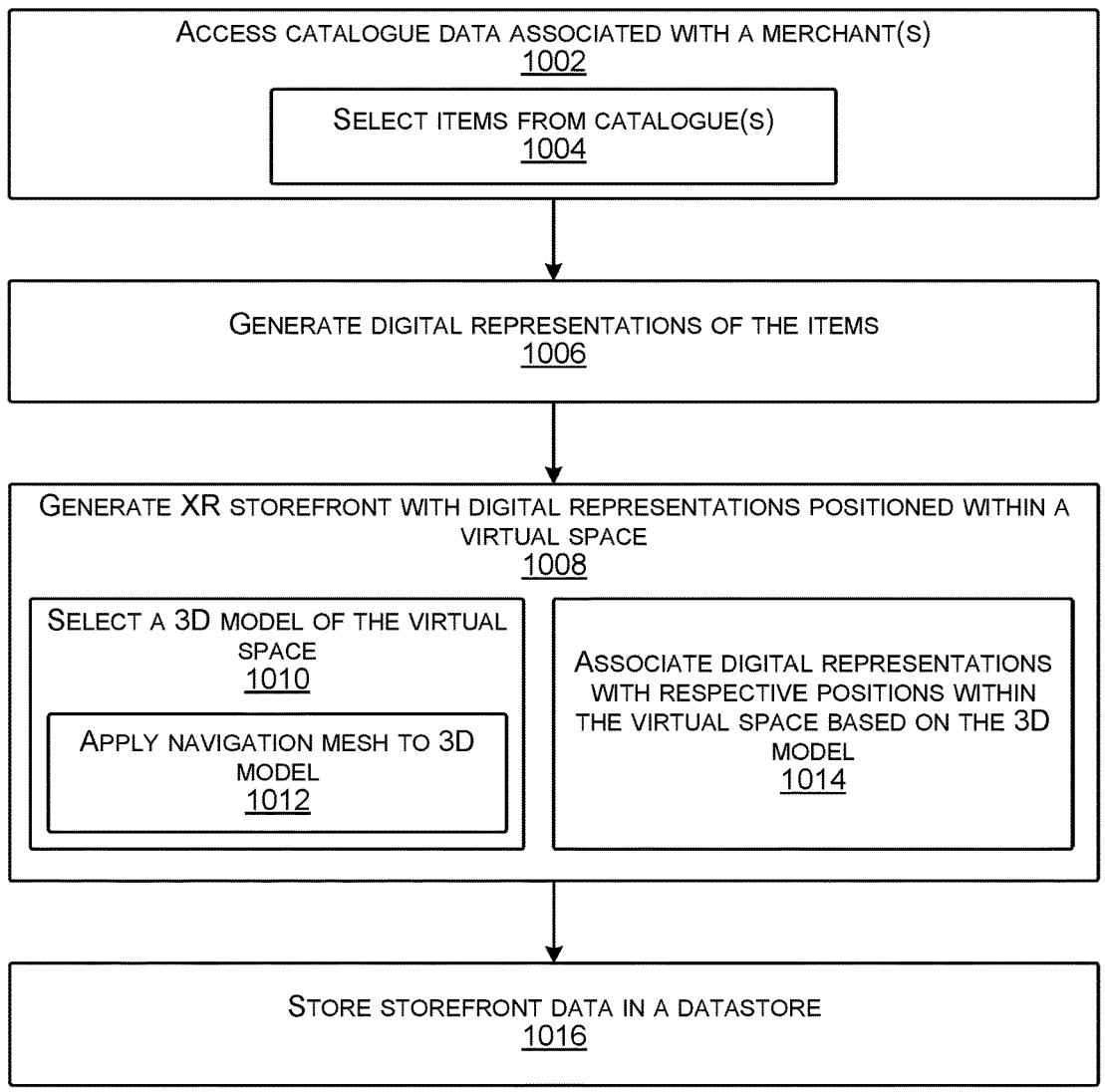
FIG. 10 is an example process for configuring and storing a XR storefront, according to an implementation of the present subject matter.

FIG. 10 is an example process 1000 for configuring and storing a XR storefront, according to an implementation of the present subject matter. The process 1000 can be implemented by a system (e.g., a computing device(s)) including one or more processors and memory storing computer-executable instructions to cause the one or more processors to perform the process 1000. In some examples, the process 1000 can be implemented by a server(s) 114 (and/or by a processor(s) of the server(s) 114), such as by executing the XR storefront service 110. For discussion purposes, the process 1000 is described with reference to the previous figures.

At 1002, catalogue data 122 associated with a merchant(s) 112 is accessed. In some examples, a computing device(s) (e.g., the server(s) 114, and/or a processor(s) thereof) may access the catalogue data 122 at block 1002. In some examples, catalogue data 122 accessed at block 1002 is associated with items offered for sale by a merchant(s) 112 via an existing online storefront(s) or an existing brick-and-mortar store(s). For example, the catalogue data 122 may include a list of items offered for sale by a merchant(s) 112 on an existing ecommerce platform represented by the server(s) 114. In some examples, the items in the catalogue data 122 may be presently offered for sale via an existing online storefront(s) that is not a XR storefront, as described herein.

At 1004, in some examples, a subset of the items included in the catalogue data 122 may be selected as selected items to showcase in a XR storefront. In some examples, a computing device(s) (e.g., the server(s) 114, and/or a processor(s) thereof) may select the items at block 1004. The selection of the items at block 1004 can be automated (e.g., without user intervention), such as based on rules and/or based on processing data, partially automated, or based on user input indicative of a selection of the selected items.

At 1006, digital representations of the items are generated. In some examples, a computing device(s) (e.g., the server(s) 114, and/or a processor(s) thereof) may generate the digital representations of the items at block 1006. Examples of digital representations 302 of items are depicted in FIGS. 3, 7, and 8 herein. In some examples, the digital representations generated at block 1006 include 2D representations and/or 3D representations. 2D representations of the items may be generated at block 1006 based at least in part on images of the items that are included in the catalogue data 122. For example, the merchant's existing online storefront may feature 2D, static images of the items, and these images may be used as, or to generate, the 2D representations of the items at block 1006. 3D representations of the items may be generated at block 1006 based at least in part on scan data obtained from scanning the items in a real-world space. For example, a 3D scanner may have been used to scan the items in the catalogue data 122 (and/or at least the items selected at block 1004), and the resulting scan data may have been uploaded to the server(s) 114 and used by the XR storefront service 110 to create 3D digital representations (e.g., 3D models) of the items at block 1006.

At 1008, a XR storefront is generated, the XR storefront including the digital representations of the items positioned within a virtual space (e.g., a 3D virtual space). In some examples, a computing device(s) (e.g., the server(s) 114, and/or a processor(s) thereof) may generate the XR storefront at block 1008. As shown by blocks 1010 to 1014, generating the XR storefront at block 1008 may include one or more sub-operation.

At 1010, for example, a 3D model of the virtual space (e.g., 3D virtual space) corresponding to the XR storefront may be selected. In some examples, a computing device(s) (e.g., the server(s) 114, and/or a processor(s) thereof) may select the 3D model at block 1010. An example of a 3D model 300 is depicted in FIG. 3. The selection of the 3D model at block 1010 can be automated (e.g., without user intervention), such as based on rules and/or based on processing data, partially automated, or based on user input indicative of a selection of the 3D model and/or a XR storefront associated with the 3D model.

At 1012, in some examples, a navigation mesh may be applied to the 3D model. In some examples, a computing device(s) (e.g., the server(s) 114, and/or a processor(s) thereof) may apply the navigation mesh to the 3D model at block 1012. An example of a navigation mesh 400 applied to a 3D model 300 is depicted in FIG. 4. The navigation mesh 400, when applied to the 3D model, may constrain movement of avatars (e.g., the avatars 902, 904 depicted in FIG. 9) within the virtual space (e.g., 3D virtual space) corresponding to the XR storefront.

At 1014, in some examples, the digital representations of the items generated at block 1006 may be associated with respective positions within the virtual space corresponding to the XR storefront based at least in part on the 3D model.

In some examples, a computing device(s) (e.g., the server(s) 114, and/or a processor(s) thereof) may associate the digital representations of the items with the respective positions within the virtual space at block 1014.

Once associated with the respective positions within the virtual space, the digital representations of the items can be positioned at the respective positions within the virtual space when the XR storefront is displayed on an end user device 106, 108.

At 1016, storefront data 126 representing the XR storefront is stored in a datastore(s) 120. In some examples, a computing device(s) (e.g., the server(s) 114, and/or a processor(s) thereof) may store the storefront data 126 in the datastore(s) 120 at block 1016. Thereafter, the storefront data 126 can be accessed from the datastore(s) 120 to, for example, cause the XR storefront to be displayed on an end user device 106, 108, as described herein.

The process 1000 can be implemented to configure and store a merchant-specific XR storefront. That is, the XR storefront may showcase digital representations of items offered for sale by a specific merchant 112. The process 1000 can additionally, or alternatively, be implemented to configure and store a customer-specific XR storefront. For example, the XR storefront may showcase digital representations of items offered for sale by multiple different merchants, such as the first merchant 112(1) (Merchant A) and the second merchant 112(2) (Merchant B) depicted in FIG. 1. Such a customer-specific XR storefront may be based on a customer's own choices of particular merchants 112 and/or particular items to include in the XR storefront, and/or the XR storefront (e.g., the 3D model corresponding thereto) may be chosen by the customer in a customer-specific XR storefront. In other words, a customer, such as the customer 102 of FIG. 1, may curate his/her own XR storefront, in some examples, and, in doing so, the process 1000 may be implemented to configure and store this customer-specific storefront. In some examples, the process 1000 can be implemented in an automated (e.g., without user intervention) or partially automated fashion based on rules and/or processing data. For example, customer data and/or merchant data accessible from the datastore(s) 120 may be accessed at any suitable time in order to curate a XR storefront that is personalized for a customer 102 or customized for a merchant 112.

Figure 11:
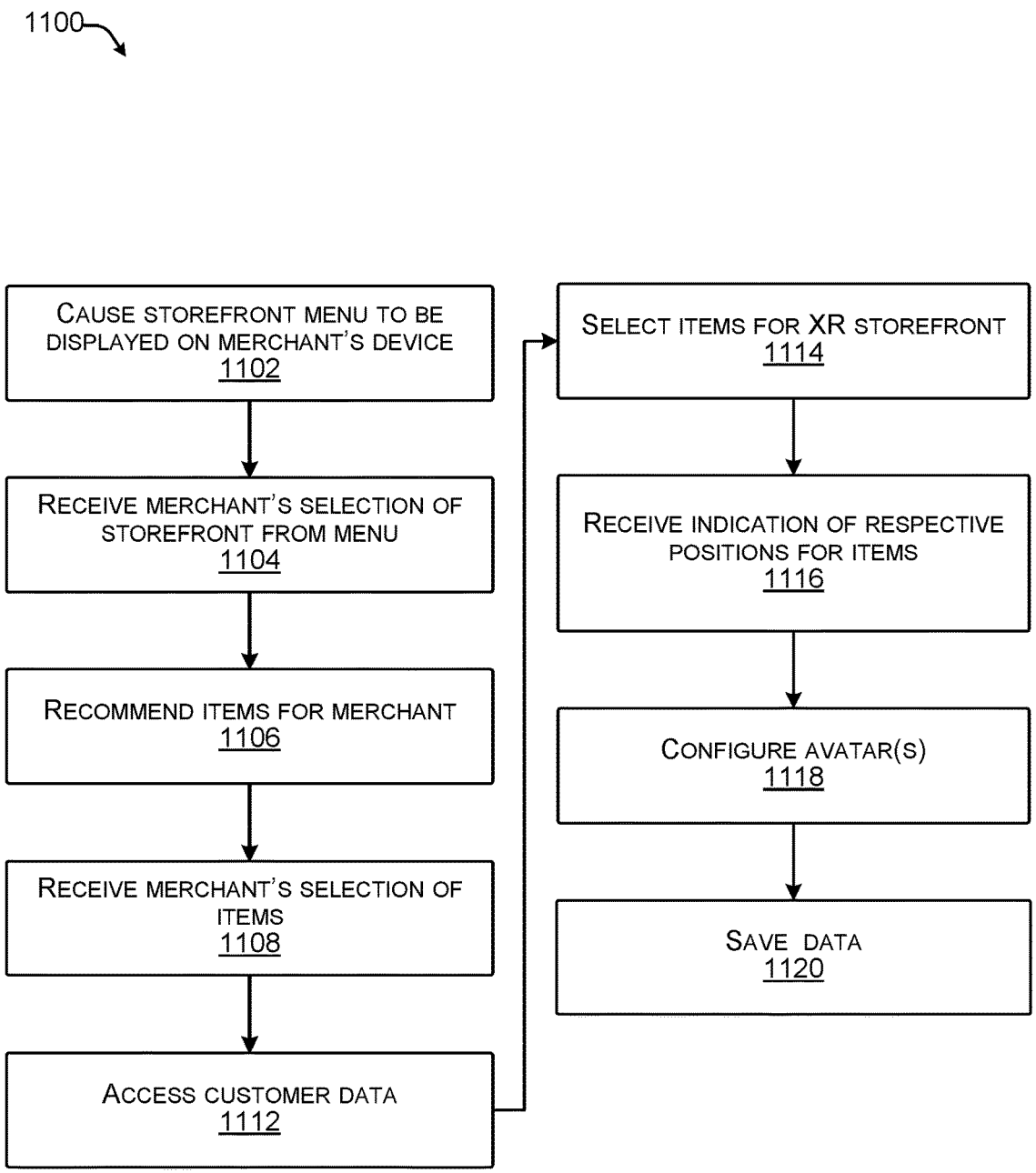
FIG. 11 is another example process for configuring and storing a XR storefront, according to an implementation of the present subject matter.

FIG. 11 is another example process 1100 for configuring and storing a XR storefront, according to an implementation of the present subject matter. The process 1100 can be implemented by a system (e.g., a computing device(s)) including one or more processors and memory storing computer-executable instructions to cause the one or more processors to perform the process 1100. In some examples, the process 1100 can be implemented by a server(s) 114 (and/or by a processor(s) of the server(s) 114), such as by executing the XR storefront service 110. For discussion purposes, the process 1100 is described with reference to the previous figures.

At 1102, a menu 124 of multiple different XR storefronts is displayed on a merchant device 116 associated with the merchant 112. In some examples, a computing device(s) (e.g., the server(s) 114, and/or a processor(s) thereof) may cause the menu 124 to be displayed on the merchant device 116 at block 1102. In some examples, the display of the menu 124 at block 1102 is based at least in part on the merchant 112 using the merchant device 116 to select the drop-down menu 202, which may cause the storefront menu 124 to be displayed on the merchant device 116.

At 1104, a selection of a XR storefront from the menu 124 is received from the merchant device 116. In some examples, a computing device(s) (e.g., the server(s) 114, and/or a processor(s) thereof) may receive the selection of the XR storefront from the merchant device 116 at block 1104. As described herein, the merchant 112 may be able to preview the XR storefronts in the menu 124 before selecting a XR storefront at block 1104, such as by selecting the preview button 204 presented via the user interface 200 in FIG. 2.

At 1106, a subset of items in the catalogue data 122 associated with the merchant 112 are recommended as recommended items to showcase in the XR storefront. In some examples, a computing device(s) (e.g., the server(s) 114, and/or a processor(s) thereof) may recommend the items at block 1106. An example of recommending items to the merchant 112 is shown as a drop-down menu 208 in FIG. 2, where the merchant 112 can interact with the drop-down menu 208 to reveal the recommended items to showcase in the XR storefront.

At 1108, a selection of items is received from the merchant device 116 associated with the merchant 112 who is configuring the XR storefront. In some examples, a computing device(s) (e.g., the server(s) 114, and/or a processor(s) thereof) may receive the merchant's 112 selection of the items at block 1108. For example, the merchant 112 may select the items via the user interface 200 depicted in FIG. 2. In some examples, the selection received at block 1108 is a selection of items from the recommended items (at block 1106).

At 1112, customer data associated with a customer 102 may be accessed from the datastore(s) 120. In some examples, a computing device(s) (e.g., the server(s) 114, and/or a processor(s) thereof) may access the customer data at block 1112. The customer data accessed at block 1112 may be indicative of customer preferences or predilections (e.g., based on favorited items and/or item categories, past purchases of items, etc.), customer demographics, upcoming events (e.g., birthdays, anniversaries, etc.) associated with the customer (e.g., based on calendar data), or the like. Accessing the customer data 1112 may be done for purposes of personalizing the XR storefront and/or the items showcased therein for the customer 102, in some examples.

At 1114, items are selected for the XR storefront. In some examples, a computing device(s) (e.g., the server(s) 114, and/or a processor(s) thereof) may select the items at block 1114. In some examples, the items selected at block 1114 are based at least in part on the selection of items received from the merchant device 116 at block 1108. In some examples, the items selected at block 1114 are based at least in part on the customer data accessed at block 1112 (e.g., to generate a personalized XR storefront for the customer 102). In some examples, items associated with multiple different merchants 112 may be selected for the XR storefront at block 1114. For example, first items offered for sale by a first merchant 112(1) via a first existing online storefront or a first existing brick-and-mortar store may be selected at block 1114, and second items offered for sale by a second merchant 112(2) via a second existing online storefront or a second existing brick-and-mortar store may be selected at block 1114, and so on and so forth for any suitable number of merchants 112.

At 1116, an indication(s) of respective positions within the virtual space corresponding to the XR storefront to position the digital representations of the items is received. In some examples, a computing device(s) (e.g., the server(s) 114, and/or a processor(s) thereof) may receive the indication(s) at block 1116. In some examples, the indication(s) is received from the merchant device 116 associated with the merchant 112 who is configuring the XR storefront. For example, the merchant 112 may provide the indication(s) of the respective positions to position the digital representations of the items via the user interface 200 of FIG. 2. In some examples, the customer 102 may provide the indication(s) at block 1116 in an example where the customer 102 is curating a XR storefront.

At 1118, one or more avatars may be configured. In some examples, a computing device(s) (e.g., the server(s) 114, and/or a processor(s) thereof) may configure the avatar(s) at block 1118. In some examples, the avatar configured at block 1118 may be a merchant avatar 904 that is to be associated with a clerk 104. In this manner, when a customer 102 accesses the XR storefront at the same time as the clerk 104, the merchant avatar 904 may be displayed within the XR storefront on the electronic device 106 of the customer 102. In some examples, the avatar configured at block 1118 may be a customer avatar 902 that is to be associated with a customer 102. In this manner, when the clerk 104 (and/or another customer) accesses the XR storefront at the same time as the customer 102, the customer avatar 902 may be displayed within the XR storefront on the electronic device 108 of the clerk 104 (and/or the electronic device 106 of the other customer).

At 1120, data may be stored to save the configured XR storefront (and possibly the configured avatar(s)). In some examples, a computing device(s) (e.g., the server(s) 114, and/or a processor(s) thereof) may store storefront data 126 in the datastore(s) 120 at block 1120, the storefront data 126 representing the XR storefront configured by implementing the preceding blocks of the process 1100. In some examples, a computing device(s) (e.g., the server(s) 114, and/or a processor(s) thereof) may store avatar data in the datastore(s) 120 at block 1120, the avatar data representing the avatar(s) (e.g., the merchant avatar(s) 904, the customer avatar(s) 902, etc.) configured at block 1118. The storefront data 126 stored at block 1120 may indicate the digital representations of the items showcased in the XR storefront (e.g., first items offered for sale by a first merchant 112(1), second items offered for sale by a second merchant 112(2), etc.), the respective positions where the digital representations of the items are positioned within the virtual space corresponding to the XR storefront, and the like.

The process 1100 can be implemented to configure and store a merchant-specific XR storefront. That is, the XR storefront may showcase digital representations of items offered for sale by a specific merchant 112. The process 1100 can additionally, or alternatively, be implemented to configure and store a customer-specific XR storefront. For example, the XR storefront may showcase digital representations of items offered for sale by multiple different merchants, such as the first merchant 112(1) (Merchant A) and the second merchant 112(2) (Merchant B) depicted in FIG. 1. In some examples, the customer data accessed at block 1112 may be used to determine contextual data associated with the customer 102, such as an upcoming event (e.g., a birthday), and the XR storefront and/or items selected for the XR storefront may be configured based at least in part on the contextual data, such as by selecting birthday-related items (e.g., balloons, plates, birthday cakes, etc.), potentially from multiple different merchants in the same XR storefront.. In some examples, the process 1100 can be implemented in an automated (e.g., without user intervention) or partially automated fashion based on rules and/or processing data. In some examples, once the data is stored at block 1120, and if the XR storefront is a customer-specific XR storefront, a notification (e.g., promotional message) may be provided, or otherwise sent, to the customer 102 indicating that a personalized XR storefront has been created for them.

Figure 12:
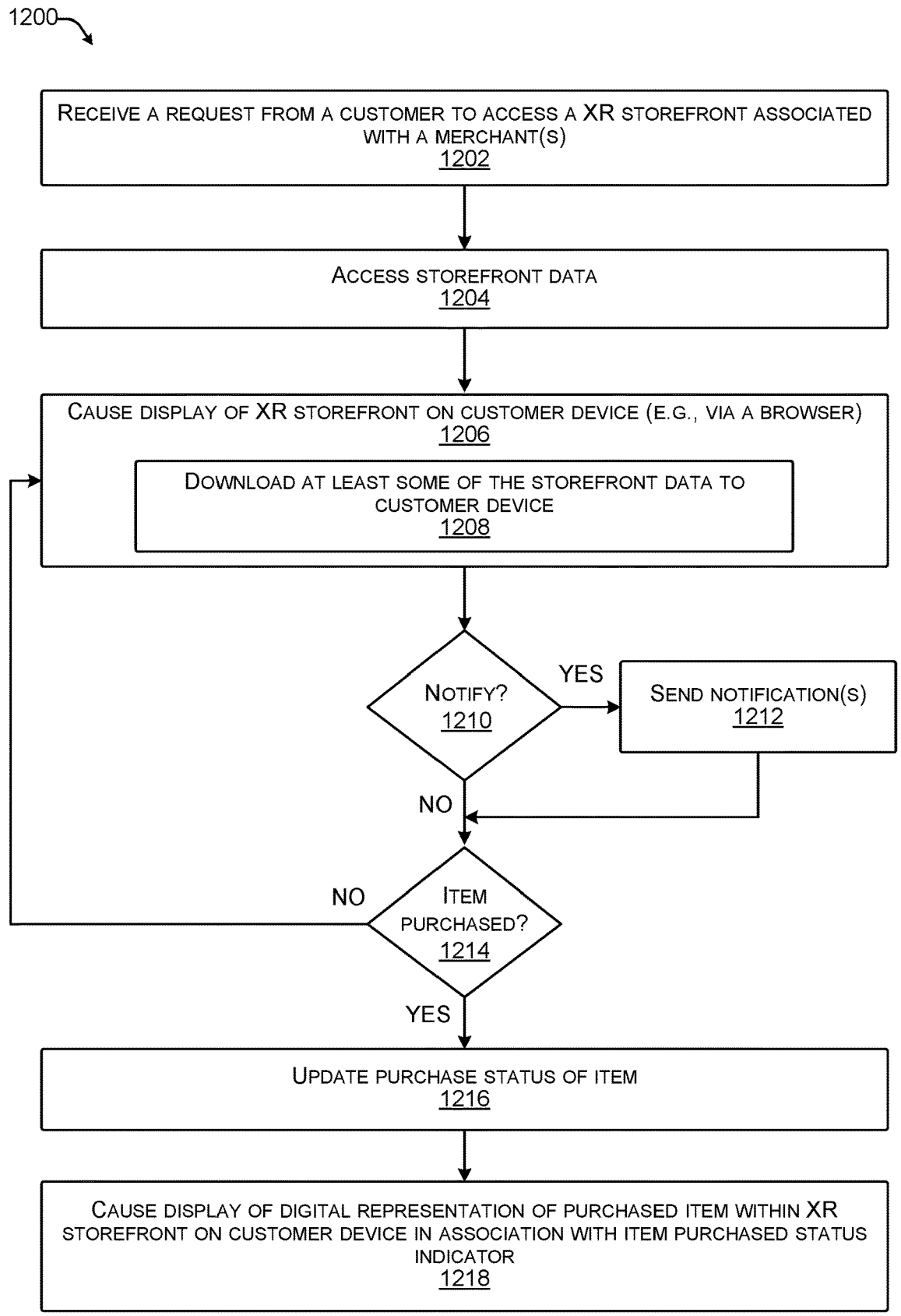
FIG. 12 is an example process for causing display of a XR storefront on an electronic device of a customer who is accessing the XR storefront, and for updating a purchase status of an item based on input provided by the customer, according to an implementation of the present subject matter.

FIG. 12 is an example process 1200 for causing display of a XR storefront on an electronic device 106 of a customer 102 who is accessing the XR storefront and for updating a purchase status of an item based on input provided by the customer 102, according to an implementation of the present subject matter. The process 1200 can be implemented by a system (e.g., a computing device(s)) including one or more processors and memory storing computer-executable instructions to cause the one or more processors to perform the process 1200. In some examples, the process 1200 can be implemented by a server(s) 114 (and/or by a processor(s) of the server(s) 114), such as by executing the XR storefront service 110. For discussion purposes, the process 1200 is described with reference to the previous figures.

At 1202, a request to access a XR storefront associated with a merchant(s) 112 is received from an electronic device 106 of a customer 102. In some examples, a computing device(s) (e.g., the server(s) 114, and/or a processor(s) thereof) may receive the request at block 1202. In some examples, the request may be received at block 1202 from a browser executing on the electronic device 106. For example, the customer 102 may have navigated to a website (e.g., by typing a URL or web address into the browser), and the request received at block 1202 may be based on the customer 102 navigating to the website and/or selecting an interactive element on a web page served by the server(s) 114.

At 1204, storefront data 126 representing the XR storefront may be accessed. In some examples, a computing device(s) (e.g., the server(s) 114, and/or a processor(s) thereof) may access the storefront data 126 from the datastore(s) 120 at block 1204. The storefront data 126 may include at least the digital representations of items and respective positions within a virtual space at which the digital representations of the items are positioned. The items associated with the digital representations included in the storefront data 126 may have been selected from a catalogue(s) of items offered for sale by the merchant(s) 112 via an existing online storefront(s) or an existing brick-and-mortar store(s). For example, the storefront data 126 accessed at block 1204 may have been generated and stored by implementing the process 1000 or the process 1100 herein.

At 1206, the electronic device 106 displays the XR storefront based at least in part on the storefront data 126. In some examples, a computing device(s) (e.g., the server(s) 114, and/or a processor(s) thereof) may cause the electronic device 106 to display the XR storefront at block 1206. In some examples, causing the electronic device 106 to display the XR storefront at block 1206 includes causing the browser executing on the electronic device 106 to display the XR storefront.

At 1208, in some examples, at least some of the storefront data 126 may be downloaded to the electronic device 106 as downloaded storefront data 126, and the XR storefront may be displayed by the browser based at least in part on the downloaded storefront data 126. In some examples, a computing device(s) (e.g., the server(s) 114, and/or a processor(s) thereof) may download the storefront data 126 to the electronic device 106 at block 1208. In some examples, the downloaded storefront data 126 comprises a package (e.g., code, such as HTML code, JavaScript code, etc.) that represents the XR storefront, the respective positions of the digital representations of the items, etc., and the code in the package is loaded to the browser to cause the browser to display the XR storefront. In some examples, the scene rendered on the electronic device 106 is based at least in part on device data (e.g., position data) that the electronic device 106 may stream to the server(s) 114, as described herein. That is, depending on the position of the electronic device 106 and/or user input provided to the electronic device 106, the server(s) 114 may determine a position within the virtual space at which the customer is positioned, and a corresponding 3D scene of the XR storefront may be rendered based at least in part on the determined position of the customer 102.

At 1210, a determination is made as to whether to notify another user about the customer 102 having accessed the XR storefront. In some examples, a computing device(s) (e.g., the server(s) 114, and/or a processor(s) thereof) may determine whether to notify another user at block 1210. In some examples, the determination made at block 1210 is whether to notify the merchant(s) 112 associated with the XR storefront (e.g., a clerk(s) 104 associated with the merchant 112 who configured the XR storefront). For example, the merchant 112 may specify, in settings, that clerks 104 should be notified about customers entering the XR storefront. In these examples, the merchant 112 may have "on-call" clerks 104 who are notified whenever a customer enters the XR storefront so that the on-call clerks 104 can access the XR storefront to interact with the customer. In some examples, the determination made at block 1210 is whether to notify another user (e.g., a friend, such as a social contact) associated with the customer 102. Accordingly, the server(s) 114 may determine whether any users (e.g., social contacts) are associated with the customer 102 who is accessing the XR storefront, and, if so those users may be notified. In some examples, the customer 102 may specify, in settings, that social contacts (or a subset thereof) should be notified about the customer 102 entering the XR storefront. In some examples, the determination made at block 1210 is whether the customer 102 has explicitly invited another user (e.g., a friend, such as a social contact) to join him/her in the XR storefront. For example, via a user interface displayed on the electronic device 106 of the customer 102, the customer 102 may select an interactive element (e.g., an "invite friends" button) to invite one or more other users to the XR storefront. In some examples, the determination made at block 1210 is whether the customer 102 has explicitly requested the presence of a clerk 104 within the XR storefront. For example, via a user interface displayed on the electronic device 106 of the customer 102, the customer 102 may select an interactive element (e.g., "call a clerk" button) to request that a clerk 104 access the XR storefront to interact with the customer 102. If it is determined, at block 1210, to notify another user(s), the process 1200 may follow the YES route from block 1210 to block 1212 where a notification(s) may be sent to another user(s) and/or another electronic device(s) 106, 108 of the user(s). This notification(s) may be a notification that the customer 102 has entered the XR storefront, and the notification(s) may include a link that, upon selection, causes the electronic device(s) of the other user(s) to access the XR storefront. Such a notification may be sent via any suitable communication channel, such as electronic mail (email), Short Message Service (SMS) text, an in-app notification (e.g., a notification sent to a mobile application installed on the electronic device(s) of the other user(s)), or the like.

At 1214, following the transmission of the notification(s) at block 1212, or following the NO route from block 1210 after a determination is made to refrain from sending a notification, a determination is made as to whether an item has been purchased within the XR storefront. In some examples, a computing device(s) (e.g., the server(s) 114, and/or a processor(s) thereof) may determine whether an item has been purchased at block 1214. In some examples, the determination made at block 1214 is based at least in part on whether user input data indicating a selection of a digital representation of an item has been received. Examples of receiving such user input data are described above with respect to FIG. 8. If no such user input data is received, the process 1200 may follow the NO route from block 1214 back to block 1206 where the XR storefront continues to be displayed on the electronic device 106 of the customer 102 without any updated purchase status indicators. If, on the other hand, the server(s) 114 receives, from the electronic device 106 of the customer 102, user input data indicating a selection of a digital representation of an item showcased in the XR storefront, the process 1200 may follow the YES route from block 1214 to block 1216.

At 1216, a purchase status of the item may be updated in the datastore(s) 120 to indicate the purchased status of the item. In some examples, a computing device(s) (e.g., the server(s) 114, and/or a processor(s) thereof) may update the purchase status of the item at block 1216. In some examples, the purchase status may be updated with respect to the customer 102 to indicate to the customer 102 that he/she has already purchased the item, in case they forget that they had purchased it. In this example, the purchase status of the item for other customers may remain as "unpurchased" or "available for purchase." In other examples, the object state is synchronized across electronic devices 106, 108 of users who are accessing the XR storefront such that other users would see the updated purchase status, at least in association with the customer 102 who purchased the item.

At 1218, the electronic device 106 of the customer 102 displays the digital representation of the purchased item within the XR storefront in association with an indication that the item has been purchased by the customer 102 based on the purchase status of the item. In some examples, a computing device(s) (e.g., the server(s) 114, and/or a processor(s) thereof) may cause the electronic device 106 to display the indication in association with the digital representation of the purchased item at block 1218. An example of such an indication 802 was described with reference to FIG. 8.

Although the process 1200 is described above with reference to a customer 102 who is accessing the XR storefront, it is to be appreciated that, when a clerk 104 accesses a XR storefront, at least some of the operations of the process 1200 may be performed in a similar manner. For example, a request may be received from an electronic device 108 of the clerk 104 at block 1202, storefront data 126 may be accessed at block 1204, and a corresponding XR storefront may be displayed on the clerk's 104 device 108 at block 1206, potentially by downloading at least some of the storefront data 126 to the clerk's 104 device 108. With respect to a clerk 104, however, blocks 1210 to 1218 may not be performed, as a clerk 104 would not be purchasing an item, and other users may not be notified about the clerk's 104 access to the XR storefront. That being said, there may be some unique attributes of a clerk's 104 experience within a XR storefront, as compared to a customer's experience within the XR storefront. For example, a clerk 104 may be permitted to relocate items (e.g., move the digital representations of the items) about the XR storefront, such as by providing user input indicative of a selection of a digital representation of an item to "grab" the item, and subsequently moving to another position within the virtual space to set the item down in a new position. This may cause the server(s) 114 to update the position of the digital representation of the item in the storefront data 126. In some examples, a customer 102 may be allowed to relocate items (e.g., move the digital representations of the items) about the XR storefront, at least temporarily. In some examples, if a customer 102 is the only customer in the XR storefront, the customer 102 may be allowed to relocate items, but if there are multiple customers in the XR storefront at a given time, the customers may be prevented from relocating items. In some examples, customers may be allowed to relocate items regardless of how many customers are in the XR storefront. In an example, a customer 102 may wish to collect multiple different digital representations of items to aid in selecting one or more items from the larger set of collected items. In another scenario, a customer 102 may wish to show an item to another customer 102 and/or ask a clerk a question about the item while using the digital representation of the item as a visual aid for the clerk. In some examples, the XR storefront service 110 may monitor the interactions of the customer 102 with a relocated digital representation of an item, and if the customer 102 does not interact with the item (e.g., view the item, grab the item, etc.) for more than a threshold period of time, the item may be automatically returned to its original location in the XR storefront. In this example, the item may suddenly "teleport" from one location to another, and/or the XR storefront service 110 may implement transitional graphics while the digital representation of the item is being returned to its original location. In other examples, relocations of digital representations of items by customers 102 may cause the server(s) 114 to update the position of the digital representation of the item in the storefront data 126, and it may be up to the merchant 112 and/or the clerk(s) 104 to reposition the digital representations that have been moved by customers, if desired. In some examples, the server(s) 114 may update the positions of digital representations of items in the storefront data 126 based on other/additional inputs, such as upon receiving image data of a brick-and-mortar store that is being streamed to the server(s) 114. For example, if streamed image data indicates that an item has been relocated within the brick-and-mortar store of a merchant 112, the position of the digital representation of the item within the XR storefront may update automatically to correspond to the real-world relocation of the item. This can allow the XR storefront to be updated dynamically/automatically when new products are placed on the shelves and/or moved from one shelf to another within a brick-and-mortar store (e.g., by store employees). In some examples, a clerk 104 may be presented with a 2D plan view of the XR storefront layout that shows respective locations of customers who are presently accessing the XR storefront, as well as additional real-time information about those customers, such as items that the customers are looking at, related items (e.g., different color options, similar items, etc.) to the items that the customers are browsing, whether the customers are new customers or return customers, or the like. This information may assist the clerk 104 in deciding what to do within the XR storefront, such as which customers to interact with, what to recommend to those customers, etc. In some examples, a merchant 112 can host an event on a specified day from a start time to an end time. Clerks 104 associated with the merchant 112 may plan to attend the event, and customers who attend the event may ask the clerks 104 in attendance questions about the merchant 112 and/or items showcased by the merchant 112 within the XR storefront, etc.

In some examples, the XR storefront service 110 may be able to access data (e.g., customer data, merchant data, etc.) from various channels based on the server(s) 114 providing additional services to merchants 112 and customers 102. For example, purchase data, sales data, etc. may be accessed by the XR storefront service 110 to determine one or more items that a customer 102 purchased (e.g., online, in a brick-and-mortar store, etc.) in the past, and based at least in part on this data, the XR storefront service 110 may be configured to present one or more visual indications (e.g., a color, an outline, a highlight, etc.) in association with one or more items that are similar to the item(s) the customer 102 has purchased in the past. In some examples, such visual indications may be presented in association with items based on customer preferences, other customers (e.g., customers who purchased this item also purchased these items, etc.). In some examples, digital representations of items can be dynamically positioned and/or repositioned within the XR storefront for a particular customer 102 based at least in part on customer data associated with the customer 102, such as customer preferences, purchase history of the customer, etc. In an example, digital representations of items that the XR storefront service 110 determines a customer 102 may be interested in (e.g., based on purchase history of the customer, customer preferences, etc.) may be positioned towards a front and/or an entrance of the XR storefront to prominently feature specific items that the customer 102 is more likely to engage with, as compared to other items. In some examples, an area (e.g., a virtual table) near an entrance of the XR storefront may include digital representations of items specifically catered to the customer 102 based on customer data accessible to the XR storefront service 110, and these items may change/refresh dynamically each time the user enters the XR storefront, and/or the items may be different for different customers such that multiple avatars located at the same location within a XR storefront may see different digital representations of items at the same location.

Figure 13:
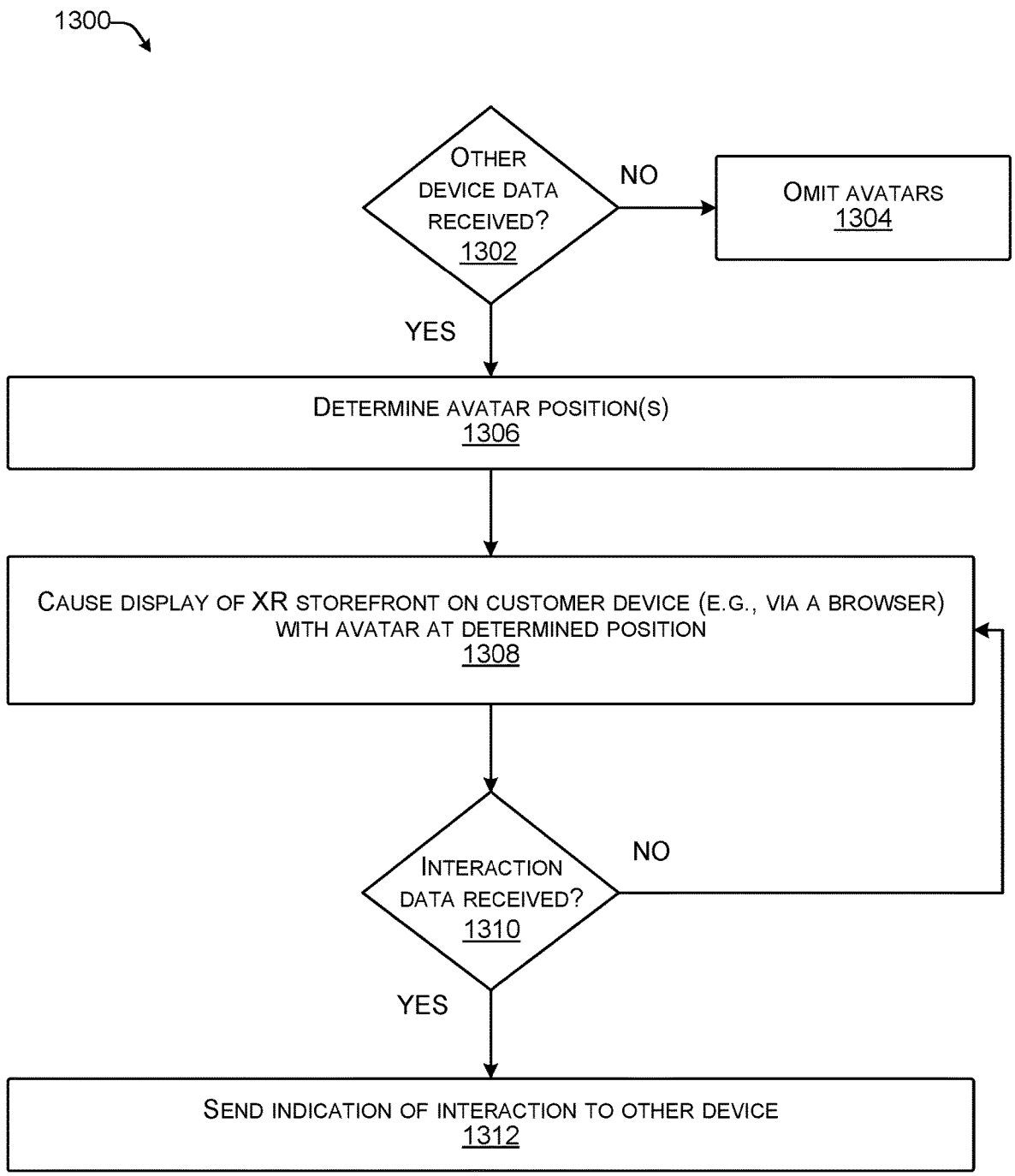
FIG. 13 is an example process for enabling interactions between users within a XR storefront, according to an implementation of the present subject matter.

FIG. 13 is an example process 1300 for enabling interactions between users within a XR storefront, according to an implementation of the present subject matter. The process 1300 can be implemented by a system (e.g., a computing device(s)) including one or more processors and memory storing computer-executable instructions to cause the one or more processors to perform the process 1300. In some examples, the process 1300 can be implemented by a server(s) 114 (and/or by a processor(s) of the server(s) 114), such as by executing the XR storefront service 110. For discussion purposes, the process 1300 is described with reference to the previous figures.

At 1302, a determination is made as to whether device data has been received from another electronic device (with respect to an electronic device 106 of a customer 102 who is presently accessing a XR storefront). In some examples, a computing device(s) (e.g., the server(s) 114, and/or a processor(s) thereof) may make the determination at block 1302. The determination made at block 1302 may be to determine if any other users are accessing the XR storefront at the same time as the customer 102 described herein. For example, it may be determined, at block 1302, whether a user (e.g., a clerk 104) associated with the merchant 1304 is accessing the XR storefront and/or whether another customer(s) is accessing the XR storefront. If no device data is received from another electronic device, the process 1300 may follow the NO route from block 1302 to block 1304 where avatars are omitted from the XR storefront, and the customer 102 experiences the XR storefront by himself/herself in this case. If device data is received from another electronic device at block 1302, the process 1300 may follow the YES route from block 1302 to block 1306.

At 1306, a position(s) of an avatar(s) may be determined based at least in part on the device data. In some examples, a computing device(s) (e.g., the server(s) 114, and/or a processor(s) thereof) may determine the avatar position(s) at block 1306. For example, the device data may include position data associated with the electronic device(s) 106, 108 that sent (e.g., streamed) the device data, which the server(s) 114 received at block 1302. Based on this position data (e.g., indicating how the other user(s) is moving within his/her own environment, and/or indicating user input provided by the other user(s), etc.), the position(s) of a corresponding avatar(s) (e.g., a merchant avatar 904, a customer avatar 902, etc.) within the virtual space corresponding to the XR storefront may be determined at block 1306.

At 1308, the electronic device 106 of the customer 102 displays (e.g., via a browser executing thereon) the XR storefront including the avatar(s) (e.g., a merchant avatar 904, a customer avatar 902, etc.) positioned at the determined position within the virtual space. In some examples, a computing device(s) (e.g., the server(s) 114, and/or a processor(s) thereof) may cause the electronic device 106 to display the XR storefront with the positioned avatar(s) at block 1308.

At 1310, a determination is made as to whether interaction data has been received (e.g., from the electronic device 106 of the customer 102). In some examples, a computing device(s) (e.g., the server(s) 114, and/or a processor(s) thereof) may make the determination at block 1310. For example, interaction data (e.g., audio data) indicating an interaction of the customer 102 with the avatar(s) may be received at block 1310. However, if no interaction data is received, the process 1300 may follow the NO route from block 1310 back to block 1308 where the XR storefront continues to be displayed with the positioned avatar(s). IF interaction data is received, the process 1300 may follow the YES route from block 1310 to block 1312.

At 1312, an indication of the interaction may be sent to another electronic device(s) 106 of the user(s) associated with the avatar(s) with which the customer 102 interacted. In some examples, a computing device(s) (e.g., the server(s) 114, and/or a processor(s) thereof) may send the indication at block 1312. In some examples, the indication comprises the interaction data itself. For example, if audio data is received from the customer's 102 device 106, indicating the customer 102 is interacting with (e.g., speaking to) the avatar(s) on the screen, the audio data received by the server(s) 114 may be streamed to the appropriate electronic device(s) 106, 108 of the user(s) 102, 104 associated with the avatar(s) being spoken to. For example, if the customer 102 is speaking to the merchant avatar 904 using a microphone of the customer's 102 device 106, the corresponding audio data may be streamed to the device 108 of the clerk 104 associated with the merchant avatar 904.

It is to be appreciated that, as customers access XR storefronts, the XR storefront service 110 may collect behavior data of customers associated with such access. Traditionally, impression data has been limited to monitoring views, clicks, and similar customer interactions on web pages. The techniques, devices, and systems described herein may allow for collection movement and/or position data associated with customers as they browse items within XR storefronts. This movement/position data may indicate items and/or areas of the XR storefront that customers tend to gravitate towards. Merchants 112 may be able to access (e.g., buy) this collected data to make decisions regarding inventory, how to showcase items within their XR storefronts, lighting to use within the XR storefront, and the like.

Figure 14:
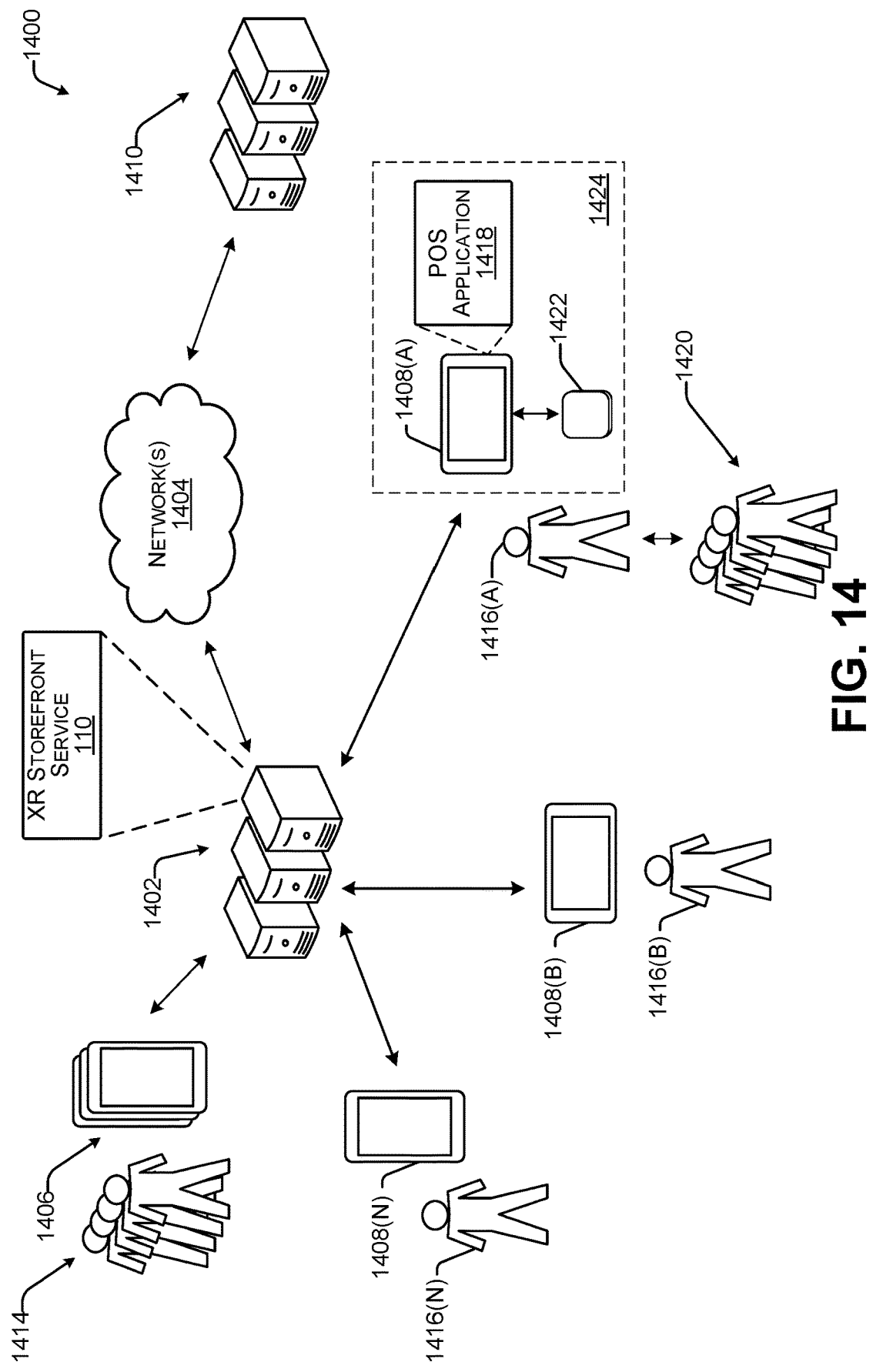
FIG. 14 is an example environment for performing techniques described herein.

FIG. 14 is an example environment 1400 for performing techniques described herein. The environment 1400 includes server(s) 1402 that can communicate over a network 1404 with user devices 1406 (which, in some examples can be merchant devices 1408 (individually, 1408(A)-1408(N))) and/or server(s) 1410 associated with third-party service provider(s). The server(s) 1402 can be associated with a service provider that can provide one or more services for the benefit of users 1414, as described below. Actions attributed to the service provider can be performed by the server(s) 1402.

For example, the server(s) 1402 may be the same as or similar to the server(s) 114 introduced in FIG. 1, and the server(s) 1402 may implement the XR storefront service 110, which may implement some of the techniques described herein. Furthermore, the network(s) 1404 may be the same as or similar to the network(s) 118 introduced in FIG. 1.

The environment 1400 can include a plurality of user devices 1406, as described above. Each one of the plurality of user devices 1406 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. The individual user devices 1406 (and in some examples, the merchant devices 1408) may be the same as or similar to the user devices 106, 108 introduced in FIG. 1. In some examples, individual ones of the user devices can be operable by users 1414. The users 1414 can be referred to as customers, buyers, merchants, sellers, borrowers, employees, employers, payors, payees, couriers and so on. The users 1414 can interact with the user devices 1406 via user interfaces presented via the user devices 1406. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1406 can have an instance or versioned instance of an application, which can be downloaded from an application store, for example, which can present the user interface(s) described herein. In at least one example, a user 1414 can interact with the user interface via touch input, spoken input, or any other type of input.

As described above, in at least one example, the users 1414 can include merchants 1416 (individually, 1416(A)-1416(N)). The individual users 1414 may be the same as or similar to the customer 102 introduced in FIG. 1, and the merchants 1416 may be the same as or similar to the merchants 112 and/or the clerk 104 introduced in FIG. 1. In an example, the merchants 1416 can operate respective merchant devices 1408, which can be user devices 1406 configured for use by merchants 1416. For the purpose of this discussion, a "merchant" can be any entity that offers items (e.g., goods or services) for purchase or other means of acquisition (e.g., rent, borrow, barter, etc.). The merchants 1416 can offer items for purchase or other means of acquisition via brick-and-mortar stores, mobile stores (e.g., pop-up shops, food trucks, etc.), online stores, combinations of the foregoing, and so forth. In some examples, at least some of the merchants 1416 can be associated with a same entity but can have different merchant locations and/or can have franchise/franchisee relationships. In additional or alternative examples, the merchants 1416 can be different merchants. That is, in at least one example, the merchant 1416(A) is a different merchant than the merchant 1416(B) and/or the merchant 1416(C).

In accordance with the examples described herein, the server(s) 1402 may access catalogue data 122 associated with items offered for sale by a merchant 1416 via an existing online storefront or an existing brick-and-mortar store. The server(s) 1402 may generate digital representations of the items, and generate a XR storefront including the digital representations of the items positioned within a virtual space. The server(s) 1402 may store storefront data 126 representing the XR storefront in a datastore(s) 120. At runtime, the server(s) 1402 may receive, from an electronic device 1406 of a customer 1414, a request to access a XR storefront associated with a merchant 1416. In response, the server(s) 1402 may access storefront data 126 representing the XR storefront, the storefront data 126 including digital representations of items and respective positions within a virtual space at which the digital representations of the items are positioned, the items having been selected from a catalogue of items offered for sale by the merchant 1416 via an existing online storefront or an existing brick-and-mortar store. The server(s) 1402 may then cause the electronic device 1406 to display the XR storefront based at least in part on the storefront data 126.

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 1408 can have an instance of a POS application 1418 stored thereon. The POS application 1418 can configure the merchant device 1408 as a POS terminal, which enables the merchant 1416(A) to interact with one or more customers 1420. As described above, the users 1414 can include customers, such as the customers 1420 shown as interacting with the merchant 1416(A). For the purpose of this discussion, a "customer" can be any entity that acquires items from merchants. While only two customers 1420 are illustrated in FIG. 14, any number of customers 1420 can interact with the merchants 1416. Further, while FIG. 14 illustrates the customers 1420 interacting with the merchant 1416(A), the customers 1420 can interact with any of the merchants 1416.

In at least one example, interactions between the customers 1420 and the merchants 1416 that involve the exchange of funds (from the customers 1420) for items (from the merchants 1416) can be referred to as "transactions." In at least one example, the POS application 1418 can determine transaction data associated with the POS transactions. Transaction data can include payment information, which can be obtained from a reader device 1422 associated with the merchant device 1408(A), user authentication data, purchase amount information, point-of-purchase information (e.g., item(s) purchased, date of purchase, time of purchase, etc.), etc. The POS application 1418 can send transaction data to the server(s) 1402 such that the server(s) 1402 can track transactions of the customers 1420, merchants 1416, and/or any of the users 1414 over time. Furthermore, the POS application 1418 can present a UI to enable the merchant 1416(A) to interact with the POS application 1418 and/or the service provider via the POS application 1418.

In at least one example, the merchant device 1408(A) can be a special-purpose computing device configured as a POS terminal (via the execution of the POS application 1418). In at least one example, the POS terminal may be connected to a reader device 1422, which is capable of accepting a variety of payment instruments, such as credit cards, debit cards, gift cards, short-range communication based payment instruments, and the like, as described below. In at least one example, the reader device 1422 can plug in to a port in the merchant device 1408(A), such as a microphone port, a headphone port, an audio-jack, a data port, or other suitable port. In additional or alternative examples, the reader device 1422 can be coupled to the merchant device 1408(A) via another wired or wireless connection, such as via a Bluetooth®, BLE, and so on. Additional details are described below with reference to FIG. 16. In some examples, the reader device 1422 can read information from alternative payment instruments including, but not limited to, wristbands and the like.

In some examples, the reader device 1422 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1422, and communicate with the server(s) 1402, which can provide, among other services, a payment processing service. The server(s) 1402 associated with the service provider can communicate with server(s) 1410, as described below. In this manner, the POS terminal and reader device 1422 may collectively process transaction(s) between the merchants 1416 and customers 1420. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1422 of the POS system 1424 are shown as separate devices, in additional or alternative examples, the POS terminal and the reader device 1422 can be part of a single device. In some examples, the reader device 1422 can have a display integrated therein for presenting information to the customers 1420. In additional or alternative examples, the POS terminal can have a display integrated therein for presenting information to the customers 1420. POS systems, such as the POS system 1424, may be mobile, such that POS terminals and reader devices may process transactions in disparate locations across the world. POS systems can be used for processing card-present transactions and card-not-present (CNP) transactions, as described below.

A card-present transaction is a transaction where both a customer 1420 and his or her payment instrument are physically present at the time of the transaction. Card-present transactions may be processed by swipes, dips, taps, or any other interaction between a physical payment instrument (e.g., a card), or otherwise present payment instrument, and a reader device 1422 whereby the reader device 1422 is able to obtain payment data from the payment instrument. A swipe is a card-present transaction where a customer 1420 slides a card, or other payment instrument, having a magnetic strip through a reader device 1422 that captures payment data contained in the magnetic strip. A dip is a card-present transaction where a customer 1420 inserts a payment instrument having an embedded microchip (i.e., chip) into a reader device 1422 first. The dipped payment instrument remains in the payment reader until the reader device 1422 prompts the customer 1420 to remove the card, or other payment instrument. While the payment instrument is in the reader device 1422, the microchip can create a one-time code which is sent from the POS system 1424 to the server(s) 1410 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 1420 may tap or hover his or her payment instrument (e.g., card, electronic device such as a smart phone running a payment application, etc.) over a reader device 1422 to complete a transaction via short-range communication (e.g., NFC, RFID, Bluetooth®, BLE, etc.). Short-range communication enables the payment instrument to exchange information with the reader device 1422. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 1424, the server(s) 1402, and/or the server(s) 1410 may exchange payment information and transaction data to determine whether transactions are authorized. For example, the POS system 1424 may provide encrypted payment data, user authentication data, purchase amount information, point-of-purchase information, etc. (collectively, transaction data) to server(s) 1402 over the network(s) 1404. The server(s) 1402 may send the transaction data to the server(s) 1410. As described above, in at least one example, the server(s) 1410 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 1410 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 1410 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 1410 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 1410 associated therewith), and a payment authorization message is communicated from the issuer to the POS device via a path opposite of that described above, or via an alternate path.

As described above, the server(s) 1410, which can be associated with payment service provider(s), may determine whether the transaction is authorized based on the transaction data, as well as information relating to parties to the transaction (e.g., the customer 1420 and/or the merchant 1416(A)). The server(s) 1410 may send an authorization notification over the network(s) 1404 to the server(s) 1402, which may send the authorization notification to the POS system 1424 over the network(s) 1404 to indicate whether the transaction is authorized. The server(s) 1402 may also transmit additional information such as transaction identifiers to the POS system 1424. In one example, the server(s) 1402 may include a merchant application and/or other functional components for communicating with the POS system 1424 and/or the server(s) 1410 to authorize or decline transactions.

Based on the authentication notification that is received by the POS system 1424 from server(s) 1402, the merchant 1416(A) may indicate to the customer 1420 whether the transaction has been approved. In some examples, approval may be indicated at the POS system 1424, for example, at a display of the POS system 1424. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 1414 can access all of the services of the service provider. In other examples, the users 1414 can have gradated access to the services, which can be based on risk tolerance, IDV outputs, subscriptions, and so on. In at least one example, access to such services can be availed to the merchants 1416 via the POS application 1418. In additional or alternative examples, each service can be associated with its own access point (e.g., application, web browser, etc.).

The service provider can offer payment processing services for processing payments on behalf of the merchants 1416, as described above. For example, the service provider can provision payment processing software, payment processing hardware and/or payment processing services to merchants 1416, as described above, to enable the merchants 1416 to receive payments from the customers 1420 when conducting POS transactions with the customers 1420. For instance, the service provider can enable the merchants 1416 to receive cash payments, payment card payments, and/or electronic payments from customers 1420 for POS transactions and the service provider can process transactions on behalf of the merchants 1416.

As the service provider processes transactions on behalf of the merchants 1416, the service provider can maintain accounts or balances for the merchants 1416 in one or more ledgers. For example, the service provider can analyze transaction data received for a transaction to determine an amount of funds owed to a merchant 1416(A) for the transaction. In at least one example, such an amount can be a total purchase price less fees charged by the service provider for providing the payment processing services. Based on determining the amount of funds owed to the merchant 1416(A), the service provider can deposit funds into an account of the merchant 1416(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 1416(A) to a bank account of the merchant 1416(A) that is held at a bank or other financial institution (e.g., associated with the server(s) 1410). Scheduled deposits can occur at a prearranged time after a POS transaction is funded, which can be a business day after the POS transaction occurred, or sooner or later. In some examples, the merchant 1416(A) can access funds prior to a scheduled deposit. For instance, the merchant 1416(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 1416(A) can have a payment instrument that is linked to the stored balance that enables the merchant to access the funds without first transferring the funds from the account managed by the service provider to the bank account of the merchant 1416(A).

In at least one example, the service provider may provide inventory management services. That is, the service provider may provide inventory tracking and reporting. Inventory management services may enable the merchant 1416(A) to access and manage a database storing data associated with a quantity of each item that the merchant 1416(A) has available (i.e., an inventory). Furthermore, in at least one example, the service provider can provide catalog management services to enable the merchant 1416(A) to maintain a catalog, which can be a database storing data associated with items that the merchant 1416(A) has available for acquisition (i.e., catalog management services). In at least one example, the catalog may include a plurality of data items and a data item of the plurality of data items may represent an item that the merchant 1416(A) has available for acquisition. The service provider can offer recommendations related to pricing of the items, placement of items on the catalog, and multi-party fulfilment of the inventory.

In at least one example, the service provider can provide business banking services, which allow the merchant 1416(A) to track deposits (from payment processing and/or other sources of funds) into an account of the merchant 1416(A), payroll payments from the account (e.g., payments to employees of the merchant 1416(A)), payments to other merchants (e.g., business-to-business) directly from the account or from a linked debit card, withdrawals made via scheduled deposit and/or instant deposit, etc. Furthermore, the business banking services can enable the merchant 1416(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1416 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1416. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the server provider associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 1414 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 1416. In at least one example, the service provider can recommend and/or generate content items to supplement omni-channel presences of the merchants 1416. That is, if a merchant of the merchants 1416 has a web page, the service provider—via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 1414 to set schedules for scheduling appointments and/or users 1414 to schedule appointments.

In some examples, the service provider can provide restaurant management services to enable users 1414 to make and/or manage reservations, to monitor front-of-house and/or back-of-house operations, and so on. In such examples, the merchant device(s) 1408 and/or server(s) 1402 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 1414 who can travel between locations to perform services for a requesting user 1414 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 1406.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 1414, voice inputs into a virtual assistant or the like, to determine intents of user(s) 1414. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 1414 may be new to the service provider such that the user 1414 that has not registered (e.g., subscribed to receive access to one or more services offered by the service provider) with the service provider. The service provider can offer onboarding services for registering a potential user 1414 with the service provider. In some examples, onboarding can involve presenting various questions, prompts, and the like to a potential user 1414 to obtain information that can be used to generate a profile for the potential user 1414. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 1414 providing all necessary information, the potential user 1414 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 1410). That is, the service provider can offer IDV services to verify the identity of users 1414 seeking to use or using their services. Identity verification requires a customer (or potential customer) to provide information that is used by compliance departments to prove that the information is associated with an identity of a real person or entity. In at least one example, the service provider can perform services for determining whether identifying information provided by a user 1414 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 1410 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 1402) and/or the server(s) 1410 via the network(s) 1404. In some examples, the merchant device(s) 1408 are not capable of connecting with the service provider (e.g., the server(s) 1402) and/or the server(s) 1410, due to a network connectivity issue, for example. In additional or alternative examples, the server(s) 1402 are not capable of communicating with the server(s) 1410 due to network connectivity issue, for example. In such examples, devices may operate in "offline" mode where at least some payment data is stored (e.g., on the merchant device(s) 1408 and/or the server(s) 1402 until connectivity is restored and the payment data can be transmitted to the server(s) 1402 and/or the server(s) 1410 for processing.

In at least one example, the service provider can be associated with a hub, such as an order hub, an inventory hub, a fulfillment hub and so on, which can enable integration with one or more additional service providers (e.g., associated with the additional server(s) 1410). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 1406 that are in communication with one or more server computing devices 1402 of the service provider. That is, techniques described herein are directed to a specific implementation—or, a practical application—of utilizing a distributed system of user devices 1406 that are in communication with one or more server computing devices 1402 of the service provider to perform a variety of services, as described above. The unconventional configuration of the distributed system described herein enables the server(s) 1402 that are remotely-located from end-users (e.g., users 1414) to intelligently offer services based on aggregated data associated with the end-users, such as the users 1414 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1414 and user devices 1406. Furthermore, such features are changed dynamically based on the profiles of the users involved interacting with the GUIs. As such, techniques described herein are directed to improvements to computing systems.

Figure 15:
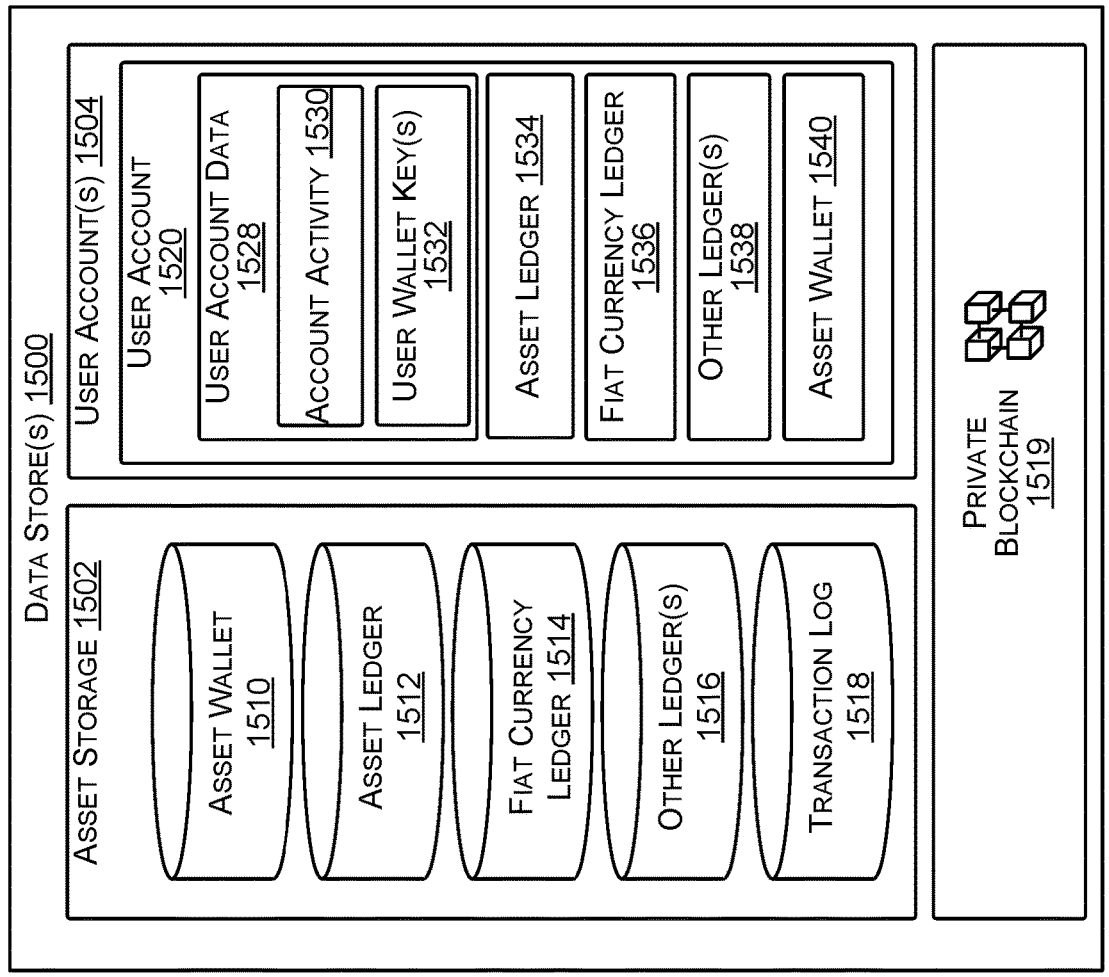
FIG. 15 is an example data store used for performing techniques described herein.
Figure 15:
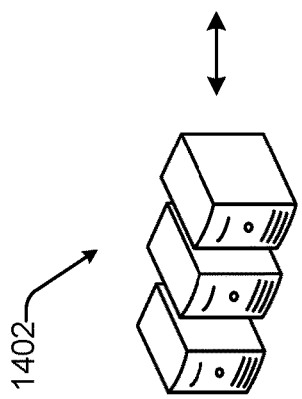

FIG. 15 is an example data store 1500 used for performing techniques described herein. The data store(s) 1500 can be associated with the server(s) 1402. The data store(s) 1500 may be the same as or similar to the data store(s) 120 introduced in FIG. 1.

In at least one example, the data store(s) 1500 can store assets in an asset storage 1502, as well as data in user account(s) 1504, merchant account(s) 1506, and/or customer account(s) 1508. In at least one example, the asset storage 1502 can be used to store assets managed by the service provider of FIG. 14. In at least one example, the asset storage 1502 can be used to record whether individual of the assets are registered to users. For example, the asset storage 1502 can include an asset wallet 1510 for storing records of assets owned by the service provider of FIG. 14, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 1010 can be associated therewith. In some examples, the asset wallet 1510 can communication with the asset network via one or more components associated with the server(s) 1002.

The asset wallet 1510 can be associated with one or more addresses and can vary addresses used to acquire assets (e.g., from the asset network(s)) so that its holdings are represented under a variety of addresses on the asset network. In examples where the service provider of FIG. 14 has its own holdings of cryptocurrency (e.g., in the asset wallet 1510), a user can acquire cryptocurrency directly from the service provider of FIG. 14. In some examples, the service provider of FIG. 14 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 1502 may contain ledgers that store records of assignments of assets to users 1014, 1016. Specifically, the asset storage 1502 may include asset ledger 1510, fiat currency ledger 1514, and other ledger(s) 1516, which can be used to record transfers of assets between users 1014, 1016 of the service provider and/or one or more third-parties (e.g., merchant network(s), payment card network(s), ACH network(s), equities network(s), the asset network, securities networks, etc.). In doing so, the asset storage 1502 can maintain a running balance of assets managed by the service provider of FIG. 14. The ledger(s) of the asset storage 1502 can further indicate some of the running balance for each of the ledger(s) stored in the asset storage 1502 is assigned or registered to one or more user account(s) 1504.

In at least one example, the asset storage 1502 can include transaction logs 1518, which can include records of past transactions involving the service provider of FIG. 14. In at least one example, transaction data, as described herein, can be stored in association with the transaction logs 1518.

In some examples, the data store(s) 1500 can store a private blockchain 1519. A private blockchain 1519 can function to record sender addresses, recipient addresses, public keys, values of cryptocurrency transferred, and/or can be used to verify ownership of cryptocurrency tokens to be transferred. In some examples, the service provider of FIG. 14 can record transactions taking place within the service provider of FIG. 14 involving cryptocurrency until the number of transactions has exceeded a determined limit (e.g., number of transactions, storage space allocation, etc.). Based at least in part on determining that the limit has been reached, the service provider of FIG. 14 can publish the transactions in the private blockchain 1519 to a public blockchain (e.g., associated with the asset network), where miners can verify the transactions and record the transactions to blocks on the public blockchain. In at least one example, the service provider of FIG. 14 can participate as miner(s) at least for its transactions to be posted to the public blockchain.

In at least one example, the data store(s) 1500 can store and/or manage accounts, such as user account(s) 1504, merchant account(s) 1506, and/or customer account(s) 1508. In at least one example, the user account(s) 1504 may store records of user accounts associated with the users 1014, 1016. In at least one example, the user account(s) 1504 can include a user account 1520, which can be associated with a user (of the users 1014). Other user accounts of the user account(s) 1504 can be similarly structured to the user account 1520, according to some examples. In other examples, other user accounts may include more or less data and/or account information than that provided by the user account 1520. In at least one example, the user account 1520 can include user account data 1528, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1528 can include account activity 1530 and user wallet key(s) 1532. The account activity 1530 may include a transaction log for recording transactions associated with the user account 1520. In some examples, the user wallet key(s) 1532 can include a public-private key-pair and a respective address associated with the asset network or other assert networks. In some examples, the user wallet key(s) 1532 may include one or more key pairs, which can be unique to the asset network or other asset networks.

In addition to the user account data 1528, the user account 1520 can include ledger(s) for account(s) managed by the service provider of FIG. 14, for the user. For example, the user account 1520 may include an asset ledger 1534, a fiat currency ledger 1536, and/or one or more other ledgers 1538. The ledger(s) can indicate that a corresponding user utilizes the service provider of FIG. 14 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 14.

In some examples, the asset ledger 1534 can store a balance for each of one or more cryptocurrencies (e.g., Bitcoin, Ethereum, Litecoin, etc.) registered to the user account 1520. In at least one example, the asset ledger 1534 can further record transactions of cryptocurrency assets associated with the user account 1520. For example, the user account 1520 can receive cryptocurrency from the asset network using the user wallet key(s) 1532. In some examples, the user wallet key(s) 1532 may be generated for the user upon request. User wallet key(s) 1532 can be requested by the user in order to send, exchange, or otherwise control the balance of cryptocurrency held by the service provider of FIG. 14 (e.g., in the asset wallet 1510) and registered to the user. In some examples, the user wallet key(s) 1532 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 14 and the value is credited as a balance in asset ledger 1534), by purchasing currency in the form associated with the account using currency in a different form (e.g., buying a value of cryptocurrency from the service provider of FIG. 14 using a value of fiat currency reflected in fiat currency ledger, and crediting the value of cryptocurrency in asset ledger 1534), or by conducting a transaction with another user (customer or merchant) of the service provider of FIG. 14 wherein the account receives incoming currency (which can be in the form associated with the account or a different form, in which the incoming currency may be converted to the form associated with the account). In some examples, the user account data 1528 can include preferences for maintaining balances of individual of the ledgers. For example, the service provider of FIG. 14 can automatically debit the fiat currency ledger 1536 to increase the asset ledger 1534, or another account associated with the user whenever the cryptocurrency balance (e.g., of the asset ledger 1534) falls below a stated level (e.g., a threshold). Conversely, in some embodiments, the service provider of FIG. 14 can automatically credit the fiat currency ledger 1536 to decrease the asset ledger 1534 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party (e.g., associated with the third-party server(s) 120) unrelated to the service provider of FIG. 14 (i.e., an external account). In at least one example, the user can transfer all or a portion of a balance of the cryptocurrency stored in the third-party cryptocurrency wallet to the service provider of FIG. 14. Such a transaction can require the user to transfer an amount of the cryptocurrency in a message signed by user's private key to an address provided by the service provider of FIG. 14. In at least one example, the transaction can be sent to miners to bundle the transaction into a block of transactions and to verify the authenticity of the transactions in the block. Once a miner has verified the block, the block is written to a public, distributed blockchain where the service provider of FIG. 14 can then verify that the transaction has been confirmed and can credit the user's asset ledger 1534 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 14. As described above, in some examples, the service provider of FIG. 14 can acquire cryptocurrency from a third-party source (e.g., associated with the third-party server(s)). In such examples, the asset wallet 1510 can be associated with different addresses and can vary addresses used to acquire cryptocurrency so that its holdings are represented under a variety of addresses on a blockchain. When the service provider of FIG. 14 has their own holdings of cryptocurrency, users can acquire cryptocurrency directly from the service provider of FIG. 14. In some examples, the service provider of FIG. 14 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider of FIG. 14 has its own cryptocurrency assets, cryptocurrency transferred in a transaction (e.g., data with address provided for receipt of transaction and a balance of cryptocurrency transferred in the transaction) can be stored in the asset wallet 1510. In at least one example, the service provider of FIG. 14 can credit the asset ledger 1534 of the user. Additionally, while the service provider of FIG. 14 recognizes that the user retains the value of the transferred cryptocurrency through crediting the asset ledger 1534, any person that inspects the blockchain will see the cryptocurrency as having been transferred to the service provider of FIG. 14. In some examples, the asset wallet 1510 can be associated with many different addresses. In such examples, any person that inspects the blockchain may not easily associate all cryptocurrency stored in asset wallet 1510 as belonging to the same entity. It is this presence of a private ledger that is used for real-time transactions and maintained by the service provider of FIG. 14, combined with updates to the public ledger at other times, that allows for extremely fast transactions using cryptocurrency to be achieved. In some examples, the "private ledger" can refer to the asset ledger 1510, which in some examples, can utilize the private blockchain 1519, as described herein. The "public ledger" can correspond to a public blockchain associated with the asset network.

In at least one example, a user's asset ledger 1534, fiat currency ledger 1536, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1534. In some examples, a user can receive fiat currency or another currency in the form of payment for a transaction with another user. In at least one example, at least a portion of such funds can be converted into cryptocurrency by the service provider of FIG. 14 and used to fund the asset ledger 1534 of the user.

As addressed above, in some examples, users can also have other accounts maintained by the service provider of FIG. 14. For example, a user can also have an account in U.S. dollars, which can be tracked, for example, via the fiat currency ledger 1536. Such an account can be funded by transferring money from a bank account at a third-party bank to an account maintained by the service provider of FIG. 14 as is conventionally known. In some examples, a user can receive fiat currency in the form of payment for a transaction with another user. In such examples, at least a portion of such funds can be used to fund the fiat currency ledger 1536.

In some examples, a user can have one or more internal payment cards registered with the service provider of FIG. 14. Internal payment cards can be linked to one or more of the accounts associated with the user account 1520. In some embodiments, options with respect to internal payment cards can be adjusted and managed using an application (e.g., the payment application 1018).

In at least one example, as described above, each ledger can correspond to an account of the user that is managed by the service provider of FIG. 14. In at least one example, individual of the accounts can be associated with a wallet or a stored balance for use in payment transactions, peer-to-peer transactions, payroll payments, etc.

In at least one example, the user account 1520 can be associated with an asset wallet 1540. The asset wallet 1540 of the user can be associated with account information that can be stored in the user account data 1528 and, in some examples, can be associated with the user wallet key(s) 1532. In at least one example, the asset wallet 1540 can store data indicating an address provided for receipt of a cryptocurrency transaction. In at least one example, the balance of the asset wallet 1540 can be based at least in part on a balance of the asset ledger 1534. In at least one example, funds availed via the asset wallet 1540 can be stored in the asset wallet 1540 or the asset wallet 1510. Funds availed via the asset wallet 1510 can be tracked via the asset ledger 1534. The asset wallet 1540, however, can be associated with additional cryptocurrency funds.

In at least one example, when the service provider of FIG. 14 includes a private blockchain 1519 for recording and validating cryptocurrency transactions, the asset wallet 1540 can be used instead of, or in addition to, the asset ledger 1534. For example, at least one example, a merchant can provide the address of the asset wallet 1540 for receiving payments. In an example where a customer is paying in cryptocurrency and the customer has their own cryptocurrency wallet account associated with the service provider of FIG. 14, the customer can send a message signed by its private key including its wallet address (i.e., of the customer) and identifying the cryptocurrency and value to be transferred to the merchant's asset wallet 1540. The service provider of FIG. 14 can complete the transaction by reducing the cryptocurrency balance in the customer's cryptocurrency wallet and increasing the cryptocurrency balance in the merchant's asset wallet 1540. In addition to recording the transaction in the respective cryptocurrency wallets, the transaction can be recorded in the private blockchain 1519 and the transaction can be confirmed. A user can perform a similar transaction with cryptocurrency in a peer-to-peer transaction as described above. In at least one example, the cryptocurrency wallet account 1530 can be funded by a balance transfer from a third-party cryptocurrency wallet, as described above. Such a transaction can require a user to transfer an amount of cryptocurrency in a message signed by the user's private key to an address of the cryptocurrency wallet account 1530. The transferred amount of cryptocurrency can then be within the cryptocurrency wallet account 1530 for use in later transactions.

While the asset ledger 1534 and/or asset wallet 1540 are each described above with reference to cryptocurrency, the asset ledger 1534 and/or asset wallet 1540 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider of FIG. 14 is an aspect of the technology disclosed that enables technical advantages of increased processing speed and improved security.

Figure 16:
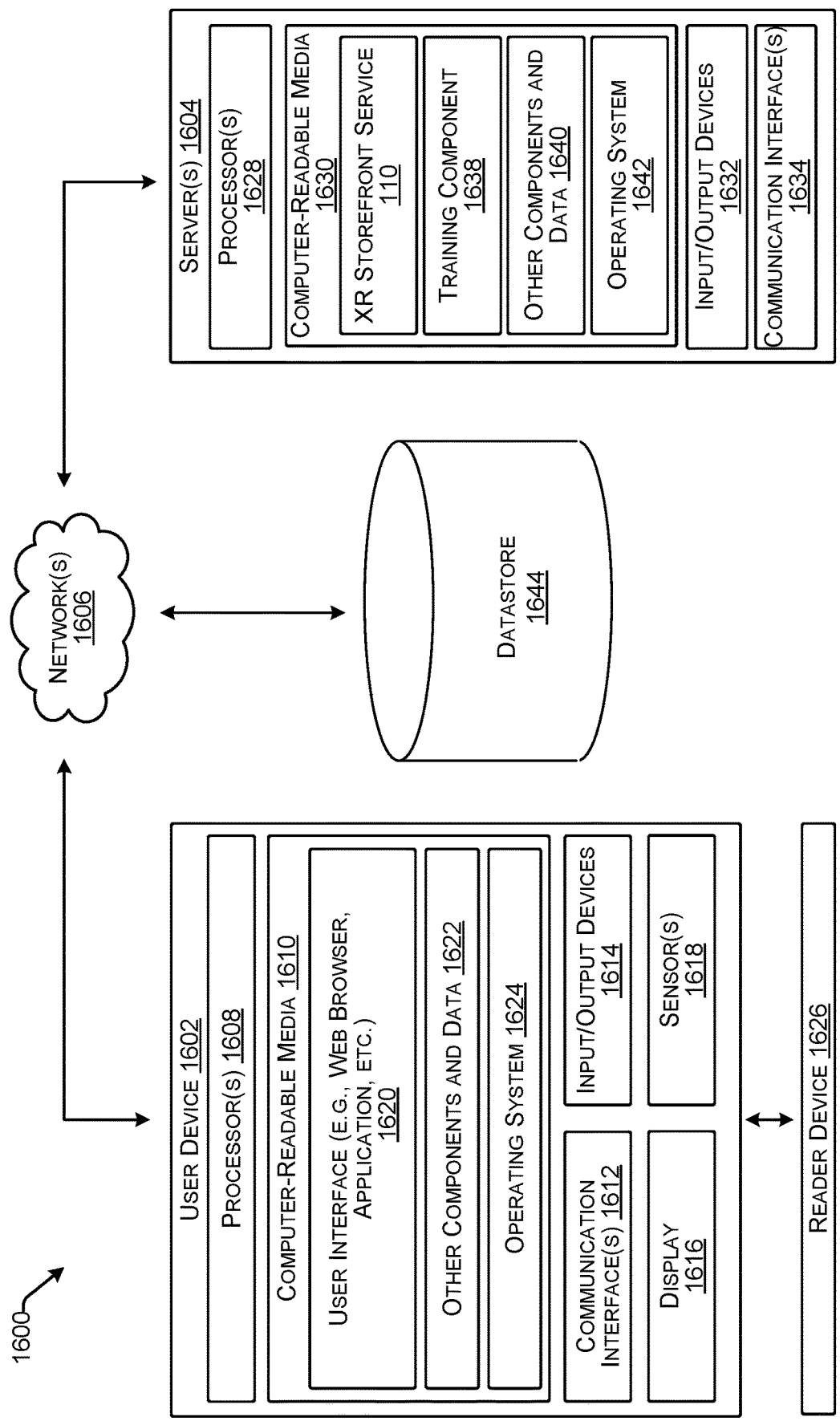
FIG. 16 is an example block diagram illustrating a system for performing techniques described herein.

FIG. 16 is an example block diagram 1600 illustrating a system for performing techniques described herein. The block diagram 1600 illustrates a system 1600 for performing techniques described herein. The system 1600 includes a user device 1602, that communicates with server computing device(s) (e.g., server(s) 1604) via network(s) 1606 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1602 is illustrated, in additional or alternate examples, the system 1600 can have multiple user devices.

For example, the server(s) 1604 may be the same as or similar to the server(s) 114 introduced in FIG. 1, and the server(s) 1604 may implement the XR storefront service 110, which may implement some of the techniques described herein. Furthermore, the network(s) 1606 may be the same as or similar to the network(s) 118 introduced in FIG. 1, and the user device 1602 may be the same as or similar to the user devices 106, 108 introduced in FIG. 1.

In at least one example, the user device 1602 can be any suitable type of computing device, e.g., portable, semi-portable, semi-stationary, or stationary. Some examples of the user device 1602 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1602 can be any computing device capable of sending communications and performing the functions according to the techniques described herein. The user device 1602 can include devices, e.g., payment card readers, or components capable of accepting payments, as described below.

In the illustrated example, the user device 1602 includes one or more processors 1608, one or more computer-readable media 1610, one or more communication interface(s) 1612, one or more input/output (I/O) devices 1614, a display 1616, and sensor(s) 1618.

In at least one example, each processor 1608 can itself comprise one or more processors or processing cores. For example, the processor(s) 1608 can be implemented as one or more microprocessors, microcomputers, microcontrollers, digital signal processors, central processing units, state machines, logic circuitries, and/or any devices that manipulate signals based on operational instructions. In some examples, the processor(s) 1608 can be one or more hardware processors and/or logic circuits of any suitable type specifically programmed or configured to execute the algorithms and processes described herein. The processor(s) 1608 can be configured to fetch and execute computer-readable processor-executable instructions stored in the computer-readable media 1610.

Depending on the configuration of the user device 1602, the computer-readable media 1610 can be an example of tangible (optionally non-transitory) computer storage media and can include volatile and nonvolatile memory and/or removable and non-removable media implemented in any type of technology for storage of information such as computer-readable processor-executable instructions, data structures, program components or other data. The computer-readable media 1610 can include, but is not limited to, RAM, ROM, EEPROM, flash memory, solid-state storage, magnetic disk storage, optical storage, and/or other computer-readable media technology. Further, in some examples, the user device 1602 can access external storage, such as RAID storage systems, storage arrays, network attached storage, storage area networks, cloud storage, or any other medium that can be used to store information and that can be accessed by the processor(s) 1608 directly or through another computing device or network. Accordingly, the computer-readable media 1610 can be computer storage media able to store instructions, components or components that can be executed by the processor(s) 1608. Further, when mentioned, (optionally non-transitory) computer-readable media exclude media such as energy, carrier signals, electromagnetic waves, and signals per se.

The computer-readable media 1610 can be used to store and maintain any number of functional components that are executable by the processor(s) 1608. In some implementations, these functional components comprise instructions or programs that are executable by the processor(s) 1608 and that, when executed, implement operational logic for performing the actions and services attributed above to the user device 1602. Functional components stored in the computer-readable media 1610 can include a user interface 1620 to enable users to interact with the user device 1602, and thus the server(s) 1604 and/or other networked devices. In at least one example, the user interface 1620 can be presented via a web browser, an in-app browser 122, or the like. In other examples, the user interface 1620 can be presented via an application, such as a mobile application or desktop application, which can be provided by a service provider associated with the server(s) 1604, or which can be an otherwise dedicated application. In some examples, the user interface 1620 can be any of the user interfaces 200, 202, and/or 300 described herein. In at least one example, a user can interact with the user interface via touch input, spoken input, gesture, or any other type of input. The word "input" is also used to describe "contextual" input that may not be directly provided by the user via the user interface 1620. For example, user's interactions with the user interface 1620 are analyzed using, e.g., natural language processing techniques, to determine context or intent of the user, which may be treated in a manner similar to "direct" user input.

In accordance with the examples described herein, the server(s) 1604 may access catalogue data 122 associated with items offered for sale by a merchant 112 via an existing online storefront or an existing brick-and-mortar store. The server(s) 1604 may generate digital representations of the items, and generate a XR storefront including the digital representations of the items positioned within a virtual space. The server(s) 1604 may store storefront data 126 representing the XR storefront in a datastore(s) 1644. At runtime, the server(s) 1604 may receive, from an electronic device 1602 of a customer 102, a request to access a XR storefront associated with a merchant 112. In response, the server(s) 1604 may access storefront data 126 representing the XR storefront, the storefront data 126 including digital representations of items and respective positions within a virtual space at which the digital representations of the items are positioned, the items having been selected from a catalogue of items offered for sale by the merchant 112 via an existing online storefront or an existing brick-and-mortar store. The server(s) 1604 may then cause the electronic device 1602 to display the XR storefront based at least in part on the storefront data 126.

Depending on the type of the user device 1602, the computer-readable media 1610 can also optionally include other functional components and data, such as other components and data 1622, which can include programs, drivers, etc., and the data used or generated by the functional components. In addition, the computer-readable media 1610 can also store data, data structures and the like, that are used by the functional components. Further, the user device 1602 can include many other logical, programmatic and physical components, of which those described are merely examples that are related to the discussion herein.

In at least one example, the computer-readable media 1610 can include additional functional components, such as an operating system 1624 for controlling and managing various functions of the user device 1602 and for enabling basic user interactions.

The communication interface(s) 1612 can include one or more interfaces and hardware components for enabling communication with various other devices, such as over the network(s) 1606 or directly. For example, communication interface(s) 1612 can enable communication through one or more network(s) 1606, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1606 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1602 can further include one or more input/output (I/O) devices 1614. The I/O devices 1614 can include speakers, a microphone, a camera, and various user controls (e.g., buttons, a joystick, a keyboard, a keypad, etc.), a haptic output device, and so forth. The I/O devices 1614 can also include attachments that leverage the accessories (audio-jack, USB-C, Bluetooth, etc.) to connect with the user device 1602.

In at least one example, user device 1602 can include a display 1616. Depending on the type of computing device(s) used as the user device 1602, the display 1616 can employ any suitable display technology. For example, the display 1616 can be a liquid crystal display, a plasma display, a light emitting diode display, an OLED (organic light-emitting diode) display, an electronic paper display, or any other suitable type of display able to present digital content thereon. In at least one example, the display 1616 can be an augmented reality display, a virtually reality display, or any other display able to present and/or project digital content. In some examples, the display 1616 can have a touch sensor associated with the display 1616 to provide a touchscreen display configured to receive touch inputs for enabling interaction with a graphic interface presented on the display 1616. Accordingly, implementations herein are not limited to any particular display technology. Alternatively, in some examples, the user device 1602 may not include the display 1616, and information can be presented by other means, such as aurally, haptically, etc.

In addition, the user device 1602 can include sensor(s) 1618. The sensor(s) 1618 can include a GPS device able to indicate location information. Further, the sensor(s) 1618 can include, but are not limited to, an accelerometer, gyroscope, compass, proximity sensor, camera, microphone, and/or a switch.

In some example, the GPS device can be used to identify a location of a user. In at least one example, the location of the user can be used by the service provider, described above, to provide one or more services. That is, in some examples, the service provider can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users and/or for sending users notifications regarding available appointments with merchant(s) located proximate to the users. In at least one example, location can be used for taking payments from nearby customers when they leave a geofence, or location can be used to initiate an action responsive to users enter a brick-and-mortar store of a merchant. Location can be used in additional or alternative ways as well.

Additionally, the user device 1602 can include various other components that are not shown, examples of which include removable storage, a power source, such as a battery and power control unit, a barcode scanner, a printer, a cash drawer, and so forth.

In addition, in some examples, the user device 1602 can include, be connectable to, or otherwise be coupled to a reader device 1626, for reading payment instruments and/or identifiers associated with payment objects. In some examples, as described above, the reader device 1626 can plug in to a port in the user device 1602, such as a microphone port, a headphone port, an audio-jack, a data port, or other suitable port. In additional or alternative examples, the reader device 1626 can be coupled to the user device 1602 via another wired or wireless connection, such as via a Bluetooth®, BLE, and so on. The reader device 1626 can include a read head for reading a magnetic strip of a payment card, and further can include encryption technology for encrypting the information read from the magnetic strip. Additionally or alternatively, the reader device 1626 can be an EMV payment reader, which in some examples, can be embedded in the user device 1602. Moreover, numerous other types of readers can be employed with the user device 1602 herein, depending on the type and configuration of the user device 1602.

The reader device 1626 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1626 may include hardware implementation, such as slots, magnetic tracks, and rails with one or more sensors or electrical contacts to facilitate detection and acceptance of a payment instrument. That is, the reader device 1626 may include hardware implementations to enable the reader device 1626 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1626 may also include a biometric sensor to receive and process biometric characteristics and process them as payment instruments, given that such biometric characteristics are registered with the payment service system 100 and connected to a financial account with a bank server.

The reader device 1626 may include processing unit(s), computer-readable media, a reader chip, a transaction chip, a timer, a clock, a network interface, a power supply, and so on. The processing unit(s) of the reader device 1626 may execute one or more components and/or processes to cause the reader device 1626 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1626, the computer-readable media may include volatile memory (such as RAM), non-volatile memory (such as ROM, flash memory, miniature hard drive, memory card, or the like), or some combination thereof. In at least one example, the computer-readable media of the reader device 1626 may include at least one component for performing various functions as described herein.

The reader chip may perform functionalities to control the operations and processing of the reader device 1626. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 1612, which may provide a clock signal indicating a time. Furthermore, the reader chip may perform functionality to control the network interface, which may interface with the network(s) 1606, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1626. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 1602, which can be a POS terminal, and the reader device 1626 are shown as separate devices, in additional or alternative examples, the user device 1602 and the reader device 1626 can be part of a single device, which may be a battery-operated device. In such an example, components of both the user device 1602 and the reader device 1626 may be associated with the single device. In some examples, the reader device 1626 can have a display integrated therewith, which can be in addition to (or as an alternative of) the display 1616 associated with the user device 1602.

The server(s) 1604 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1604 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1604 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1604 can include one or more processors 1628, one or more computer-readable media 1630, one or more I/O devices 1632, and one or more communication interfaces 1634. Each processor 1628 can be a single processing unit or a number of processing units, and can include single or multiple computing units or multiple processing cores. The processor(s) 1628 can be implemented as one or more microprocessors, microcomputers, microcontrollers, digital signal processors, central processing units, state machines, logic circuitries, and/or any devices that manipulate signals based on operational instructions. For example, the processor(s) 1628 can be one or more hardware processors and/or logic circuits of any suitable type specifically programmed or configured to execute the algorithms and processes described herein. The processor(s) 1628 can be configured to fetch and execute computer-readable instructions stored in the computer-readable media 1630, which can program the processor(s) 1628 to perform the functions described herein.

The computer-readable media 1630 can include volatile and nonvolatile memory and/or removable and non-removable media implemented in any type of technology for storage of information, such as computer-readable instructions, data structures, program components, or other data. Such computer-readable media 1630 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1604, the computer-readable media 1630 can be a type of computer-readable storage media and/or can be a tangible (optionally non-transitory) media to the extent that when mentioned, (optionally non-transitory) computer-readable media exclude media such as energy, carrier signals, electromagnetic waves, and signals per se.

The computer-readable media 1630 can be used to store any number of functional components that are executable by the processor(s) 1628. In many implementations, these functional components comprise instructions or programs that are executable by the processors 1628 and that, when executed, specifically configure the one or more processors 1628 to perform the actions attributed above to the service provider and/or payment processing service. Functional components stored in the computer-readable media 1630 can optionally include a XR storefront service 110, as described herein, a training component 1638, and one or more other components and data 1640.

The training component 1638 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a data store associated with the user device(s) 1602 and/or the server(s) 1604 for use at a time after the data models have been trained (e.g., at runtime).

The one or more other components and data 1640 can include the sub-components of the XR storefront service 110, the functionality of which is described, at least partially, above. Further, the one or more other components and data 1640 can include a merchant component configured to receive transaction data from POS systems, such as the POS system 1424 described above with reference to FIG. 14. Such a merchant component can transmit requests (e.g., authorization, capture, settlement, etc.) to payment service server computing device(s) to facilitate POS transactions between merchants and customers. Such a merchant component can communicate the successes or failures of the POS transactions to the POS systems. Further, the one or more other components and data 1640 can include programs, drivers, etc., and the data used or generated by the functional components. Further, the server(s) 1604 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on (optionally non-transitory) storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1630 can additionally include an operating system 1642 for controlling and managing various functions of the server(s) 1604.

The communication interface(s) 1634 can include one or more interfaces and hardware components for enabling communication with various other devices, such as over the network(s) 1606 or directly. For example, communication interface(s) 1634 can enable communication through one or more network(s) 1606, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1602 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1604 can further be equipped with various I/O devices 1632. Such I/O devices 1632 can include a display, various user interface controls (e.g., buttons, joystick, keyboard, mouse, touch screen, biometric or sensory input devices, etc.), audio speakers, connection ports and so forth.

In at least one example, the system 1600 can include a datastore 1644 that can be configured to store data that is accessible, manageable, and updatable. The data store 1644 may be the same as or similar to the data store(s) 120 introduced in FIG. 1. In some examples, the datastore 1644 can be integrated with the user device 1602 and/or the server(s) 1604. In other examples, as shown in FIG. 16, the datastore 1644 can be located remotely from the server(s) 1604 and can be accessible to the server(s) 1604. The datastore 1644 can comprise multiple databases and/or servers connected locally and/or remotely via the network(s) 1606.

In at least one example, the datastore 1644 can store user profiles, which can include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

In at least one example, the account(s) can include or be associated with the merchant profiles and/or customer profiles described above.

Furthermore, in at least one example, the datastore 1644 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1644 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

What is claimed is:

1. A computer-implemented method comprising:
   accessing, by a computing device, catalogue data associated with items offered for sale by a merchant via an existing online storefront or an existing brick-and-mortar store;

based at least in part on stored customer data of a customer stored in a datastore, selecting, by the computing device, selected items of the items to showcase in an extended reality storefront personalized to the customer;

responsive to selecting the selected items, generating, by the computing device, digital representations of individuals of the selected items;

selecting, by the computing device, a 3D model from a plurality of 3D models, wherein the selecting comprises:

selecting based at least in part on user input received by the computing device from a first merchant computing device associated with the merchant; or selecting performed without user intervention via application by the computing device of one or more rules;

generating, by the computing device, the extended reality storefront including the digital representations of the selected items positioned within a three-dimensional (3D) virtual space, wherein generating the extended reality storefront comprises associating the digital representations of the selected items with respective positions within the 3D virtual space based on the 3D model;

storing, by the computing device, storefront data representing the extended reality storefront;

receiving, by the computing device and from a browser executing on an electronic device of the customer, an indication of access to the extended reality storefront by the customer; and based at least in part on receiving the indication, sending, by the computing device, a notification to the first merchant computing device or a second merchant computing device associated with the merchant, wherein the notification includes a link that, upon selection, allows access to the extended reality storefront via a merchant avatar.

2. The computer-implemented method of claim 1, wherein the extended reality storefront comprises a virtual reality storefront, the computer-implemented method further comprising:

receiving, by the computing device, a request from the browser executing on the electronic device of the customer;

causing, by the computing device, the browser to display the virtual reality storefront based on the storefront data;

receiving, by the computing device, user input data from the electronic device of the customer, the user input data indicating a selection of a digital representation of an item among the digital representations of the selected items;

updating, by the computing device, a purchase status of the item in a database; and causing, by the computing device, the browser to display the digital representation of the item within the virtual reality storefront with an indication that the item has been purchased by the customer based on the purchase status of the item.

3. The computer-implemented method of claim 1, wherein selecting the 3D model comprises selecting performed without user intervention via the application by the computing device of the one or more rules.

4. The computer-implemented method of claim 1, further comprising:

receiving, by the computing device, a selection of the selected items from the first merchant computing device, wherein the selecting the selected items is based on the selection of the selected items received from the first merchant computing device.

5. A system comprising:

one or more processors; and computer-executable instructions that, when executed by the one or more processors, cause the one or more processors to perform operations comprising:

accessing catalogue data associated with items offered for sale by a merchant via an existing online storefront or an existing brick-and-mortar store;

selecting a subset of the items based at least in part on stored customer data associated with a customer stored in a datastore;

responsive to selecting the subset of the items, generating digital representations of individuals of the subset of the items;

selecting a 3D model from a plurality of 3D models, wherein the selecting comprises:

selecting based at least in part on user input received from a first merchant computing device associated with the merchant; or selecting performed without user intervention via application of one or more rules;

generating an extended reality storefront including the digital representations of the items positioned within a virtual space, wherein generating the extended reality storefront comprises associating the digital representations of the subset of the items with respective positions within the virtual space based on the 3D model;

storing storefront data representing the extended reality storefront;

receiving, from a browser executing on an electronic device of the customer, an indication of access to the extended reality storefront by the customer; and based at least in part on receiving the indication, sending a notification to the first merchant computing device or a second merchant computing device associated with the merchant, wherein the notification includes a link that, upon selection, allows access to the extended reality storefront via a merchant avatar.

6. The system of claim 5, the operations further comprising:

receiving a request from the browser executing on the electronic device of the customer; and causing the browser to display the extended reality storefront based at least in part on the storefront data.

7. The system of claim 5, wherein selecting the 3D model comprises selecting performed without user intervention via the application by the computing device of the one or more rules.

8. The system of claim 5, wherein the generating of the extended reality storefront comprises applying a navigation mesh to the 3D model to constrain movement of avatars within the virtual space.

9. The system of claim 5, wherein the digital representations comprise two-dimensional (2D) representations of the items based at least in part on images of the items that are included in the catalogue data.

10. The system of claim 5, wherein:
the catalogue data is further associated with second items offered for sale by a second merchant via a second existing online storefront or a second existing brick-and-mortar store; and
the operations further comprise generating second digital representations of the second items,
wherein the extended reality storefront personalized to the customer further includes the second digital representations of the second items positioned within a same 3D virtual space based on a same 3D model.

11. The system of claim 10, the operations further comprising:
selecting the second items based at least in part on the stored customer data.

12. The system of claim 5, the operations further comprising:
recommending a plurality of the items as recommended items to showcase in the extended reality storefront; and
selecting the subset of the items from the plurality of the items.

13. The system of claim 5, the operations further comprising:
configuring at least one of the merchant avatar or a customer avatar; and
storing avatar data representing the at least one of the merchant avatar or the customer avatar in the datastore.

14. The system of claim 5, the operations further comprising:
causing a menu of multiple different extended reality storefronts to be displayed on a merchant device associated with the merchant; and
receiving, from the merchant device, a selection of the extended reality storefront from the menu,
wherein the generating of the extended reality storefront is based at least in part on the selection received from the merchant device.

15. The system of claim 5, the operations further comprising:
receiving, from a merchant device associated with the merchant, an indication of the respective positions within the virtual space to position the digital representations of the subset of the items,
wherein the digital representations of the subset of the items are positioned at the respective positions within the virtual space.

16. One or more non-transitory computer-readable media storing instructions executable by one or more processors that, when executed by the one or more processors, cause the one or more processors to perform operations comprising:
accessing catalogue data associated with items offered for sale by a merchant via an existing online storefront or an existing brick-and-mortar store;
accessing customer data associated with a customer;
selecting a subset of the items based at least in part on the customer data;
responsive to selecting the subset of the items, generating digital representations of individuals of the subset of the items;
selecting a 3D model from a plurality of 3D models, wherein the selecting comprises:
selecting based at least in part on user input received from a first merchant computing device associated with the merchant; or
selecting performed without user intervention via application of one or more rules;
generating an extended reality storefront including the digital representations of the items positioned within a virtual space, wherein generating the extended reality storefront comprises associating the digital representations of the subset of the items with respective positions within the virtual space based on the 3D model;
storing storefront data representing the extended reality storefront;
receiving, from a browser executing on an electronic device of the customer, an indication of access to the extended reality storefront by the customer; and
based at least in part on receiving the indication, sending a notification to the first merchant computing device or a second merchant computing device associated with the merchant, wherein the notification includes a link that, upon selection, allows access to the extended reality storefront via a merchant avatar.

17. The one or more non-transitory computer-readable media of claim 16, the operations further comprising:
receiving a request from the browser executing on the electronic device of the customer; and
causing the browser to display the extended reality storefront based at least in part on the storefront data.

18. The one or more non-transitory computer-readable media of claim 16, wherein selecting the 3D model comprises selecting performed without user intervention via the application of the one or more rules.

19. The one or more non-transitory computer-readable media of claim 16, wherein the digital representations comprise two-dimensional (2D) representations of the items based at least in part on images of the items that are included in the catalogue data.

20. The one or more non-transitory computer-readable media of claim 16, wherein:
the catalogue data is further associated with second items offered for sale by a second merchant via a second existing online storefront or a second existing brick-and-mortar store; and
the operations further comprise generating second digital representations of the second items,
wherein the extended reality storefront personalized to the customer further includes the second digital representations of the second items positioned within a same 3D virtual space based on a same 3D model.

21. The one or more non-transitory computer-readable media of claim 16, wherein the merchant avatar is configured by the first merchant computing device.

* * * * *